US007917865B2

(12) United States Patent  (10) Patent No.: US 7,917,865 B2
Saijo et al.  (45) Date of Patent: Mar. 29, 2011

(54) DISPLAY PROCESSING APPARATUS, DISPLAY PROCESSING METHOD, AND COMPUTER PROGRAM PRODUCT

(75) Inventors: Hitoshi Saijo, Tokyo (JP); Takashi Nakamura, Tokyo (JP); Hiroto Yoshihara, Chiba (JP); Yoshihisa Kizuka, Tokyo (JP); Mieko Miyazawa, Kanagawa (JP); Sayoko Tanaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/421,419

(22) Filed: Apr. 9, 2009

(65) Prior Publication Data

US 2010/0058241 A1    Mar. 4, 2010

(30) Foreign Application Priority Data

Aug. 28, 2008 (JP) ................................. 2008-220535

(51) Int. Cl.
  *G06F 3/048* (2006.01)
(52) U.S. Cl. ........ 715/784; 715/785; 715/786; 715/830; 715/835
(58) Field of Classification Search .......... 715/784–786, 715/830, 835
  See application file for complete search history.

(56) References Cited

U.S. PATENT DOCUMENTS

| | | | | |
|---|---|---|---|---|
| 6,147,683 | A * | 11/2000 | Martinez et al. | 715/786 |
| 7,158,878 | B2 * | 1/2007 | Rasmussen et al. | 701/208 |
| 2003/0016253 | A1 * | 1/2003 | Aoki et al. | 345/863 |
| 2003/0052920 | A1 * | 3/2003 | Carter | 345/764 |
| 2003/0144996 | A1 * | 7/2003 | Moore, Jr. | 707/3 |
| 2004/0267447 | A1 * | 12/2004 | Takizawa | 701/209 |
| 2005/0027705 | A1 * | 2/2005 | Sadri et al. | 707/5 |
| 2005/0091604 | A1 * | 4/2005 | Davis | 715/772 |
| 2005/0138564 | A1 * | 6/2005 | Fogg | 715/745 |
| 2005/0144570 | A1 * | 6/2005 | Loverin et al. | 715/822 |
| 2005/0144571 | A1 * | 6/2005 | Loverin et al. | 715/822 |
| 2005/0171940 | A1 * | 8/2005 | Fogg et al. | 707/3 |
| 2005/0289155 | A1 * | 12/2005 | Nan et al. | 707/100 |
| 2007/0027855 | A1 | 2/2007 | Kagawa | |
| 2007/0050129 | A1 * | 3/2007 | Salmre | 701/207 |
| 2007/0088748 | A1 | 4/2007 | Matsuzaki et al. | |
| 2007/0261001 | A1 * | 11/2007 | Nagiyama et al. | 715/810 |
| 2008/0028308 | A1 * | 1/2008 | Brownlee et al. | 715/275 |
| 2008/0270949 | A1 * | 10/2008 | Liang | 715/859 |
| 2009/0007014 | A1 * | 1/2009 | Coomer et al. | 715/830 |

(Continued)

FOREIGN PATENT DOCUMENTS

JP  09-185482  7/1997

(Continued)

*Primary Examiner* — Ba Huynh
*Assistant Examiner* — Tuyetlien T Tran
(74) *Attorney, Agent, or Firm* — Blakely Sokoloff Taylor & Zafman, LLP

(57) ABSTRACT

According to one embodiment, an display processing apparatus includes an operation receiver, a relation calculator, a display information generator, a display controller, and a scrolling module. The operation receiver receives selection of a key content. The relation calculator calculates relation between the key content and each of second contents. The display information generator generates first display information of the key content and second display information of the second contents. The display controller displays list information in which pieces of the second display information are arranged to form concentric polygons around the first display information along directions of operation such that second display information of second content with higher relation is closer to the first display information. The scrolling module scrolls, in response to user operation, the list information. The display controller maintains the first display information in the display range.

12 Claims, 23 Drawing Sheets

U.S. PATENT DOCUMENTS

| | | | |
|---|---|---|---|
| 2009/0019031 A1* | 1/2009 | Krovitz et al. | 707/5 |
| 2009/0064029 A1* | 3/2009 | Corkran et al. | 715/781 |
| 2009/0293012 A1* | 11/2009 | Alter et al. | 715/810 |

FOREIGN PATENT DOCUMENTS

| | | |
|---|---|---|
| JP | 2001-292383 | 10/2001 |
| JP | 2007-034663 | 2/2007 |
| JP | 2007-104322 | 4/2007 |
| JP | 2007-109136 | 4/2007 |
| JP | 2007-157023 | 6/2007 |

* cited by examiner

FIG.2
TITLE: NOON COMEDY SHOW
CHANNEL: CHANNEL 00
DATE: AUG. 1, 2008 12:00-12:40
CAST: XXXXX, YYYYY
SUBTITLE: GREAT LINE UP OF COMEDIANS INVITE YOU TO ENJOY NOON OF HILARIOUS ENTERTAINMENT
GENRE: COMEDY
FIG.3A
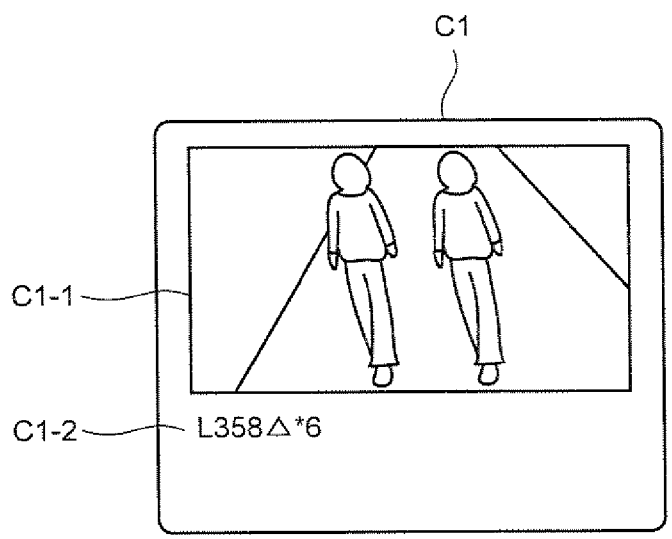
FIG.3B
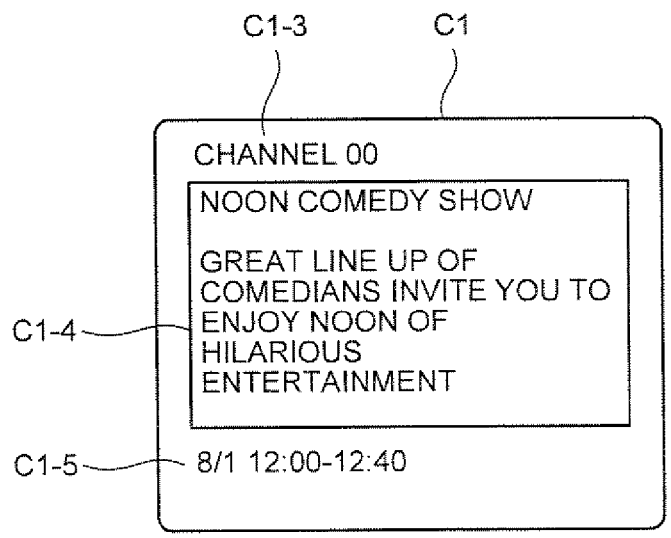

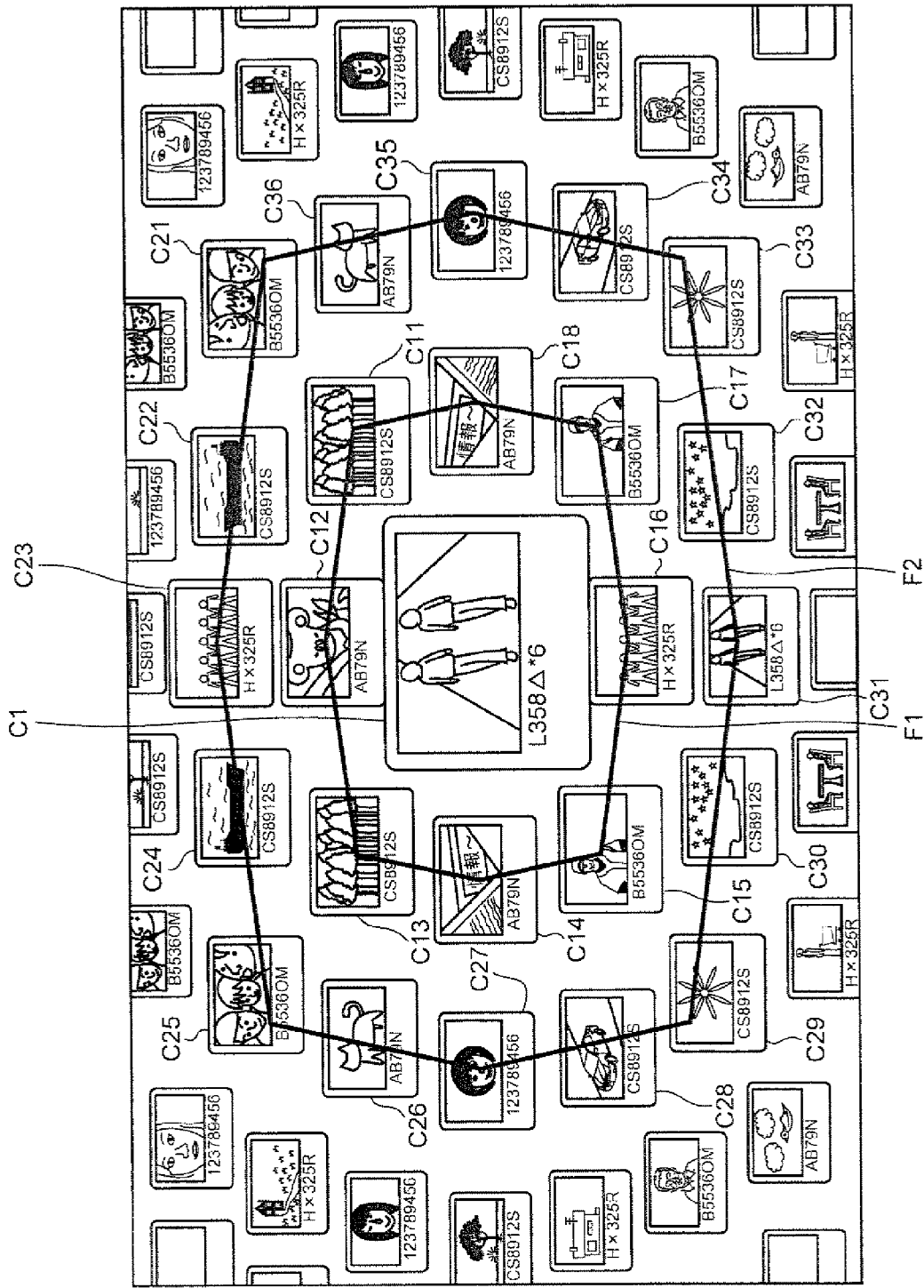

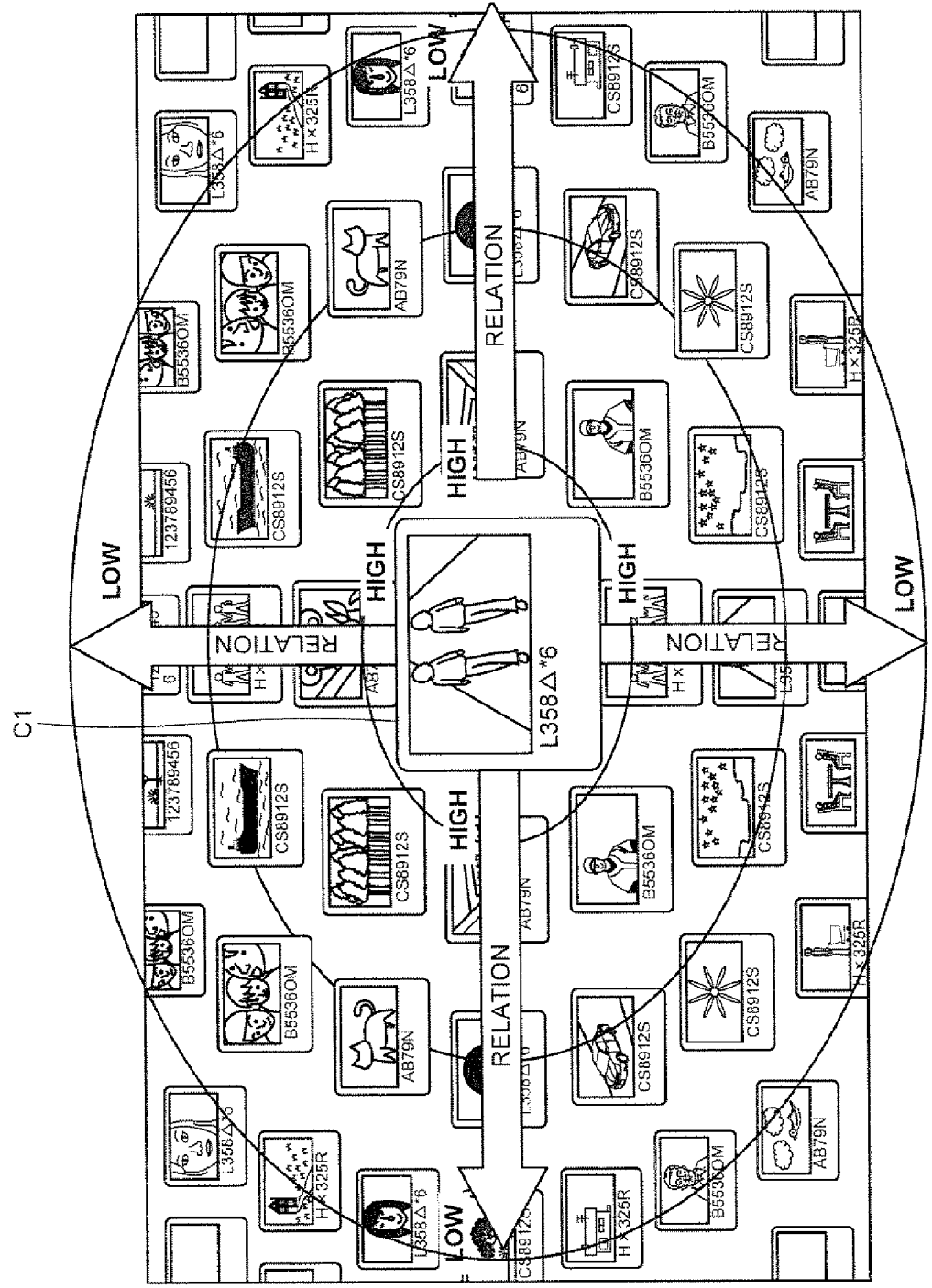

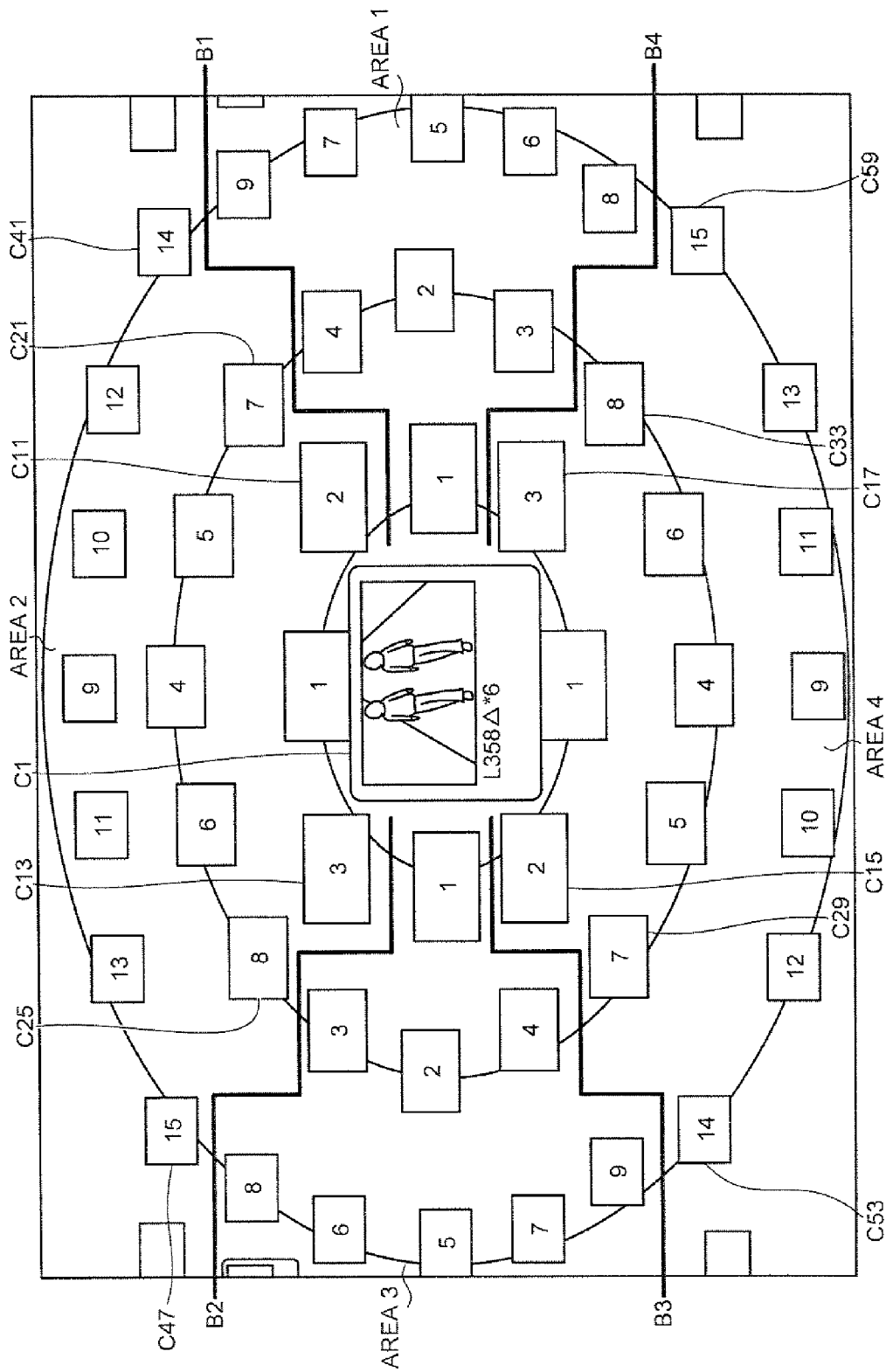

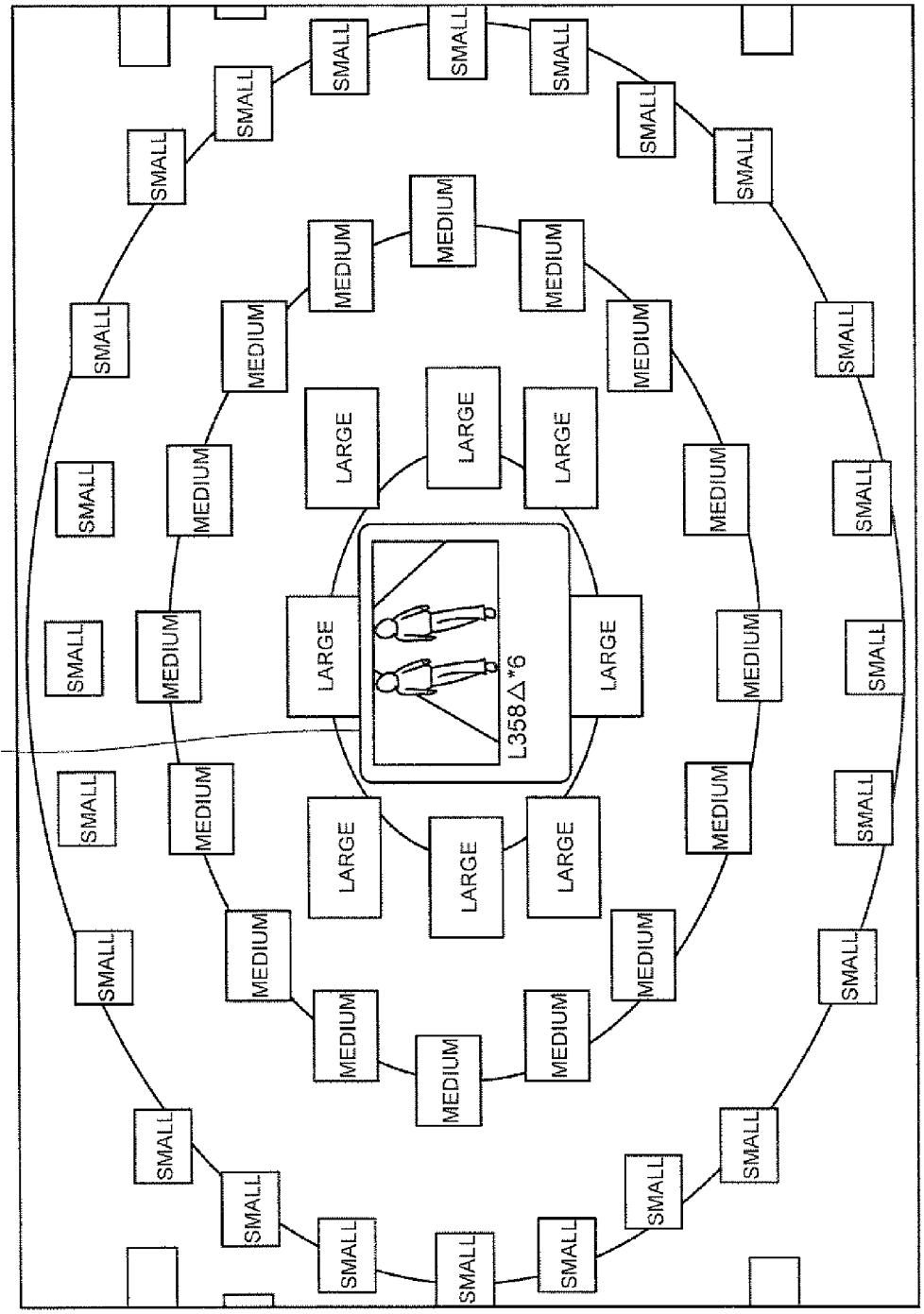

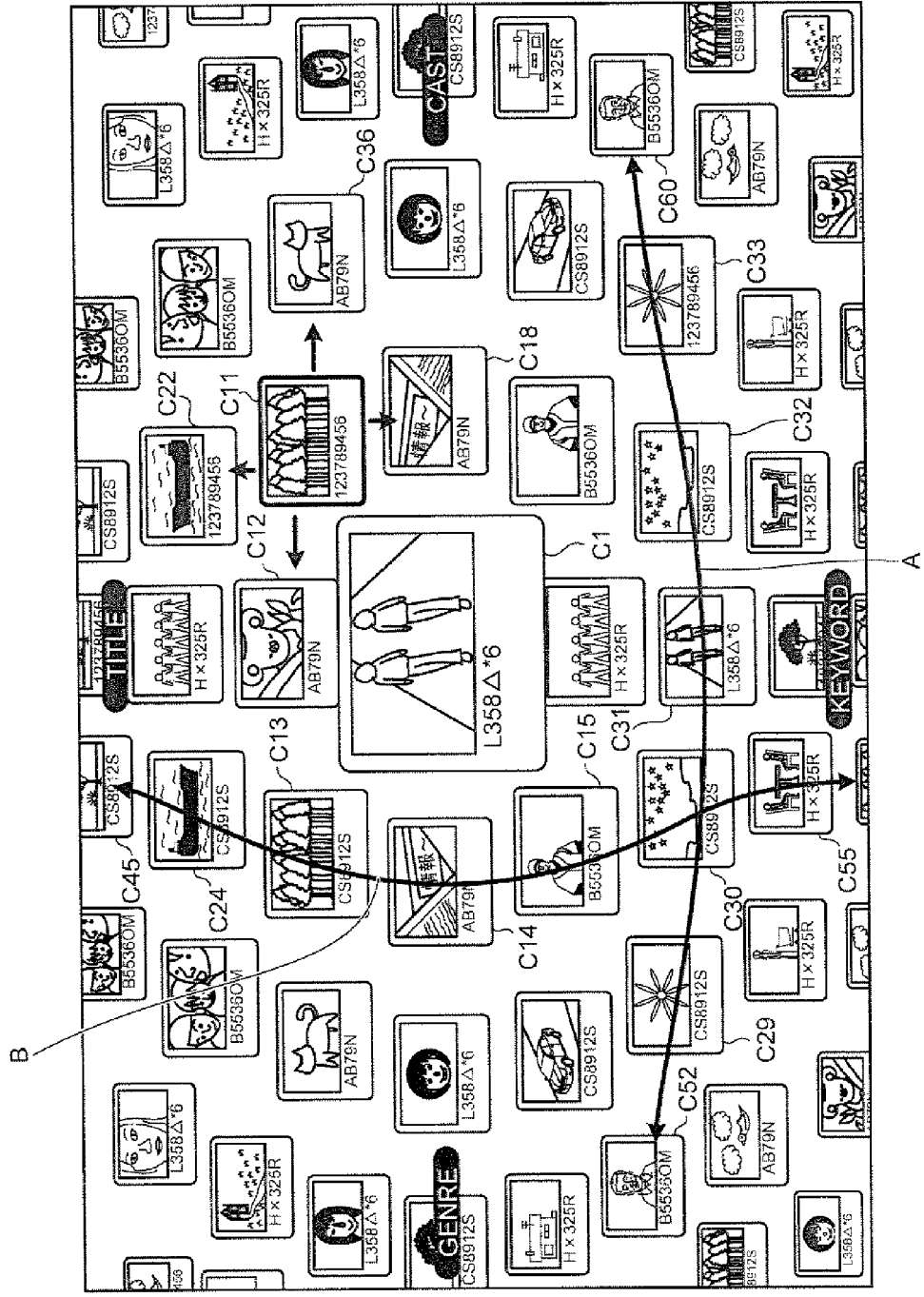

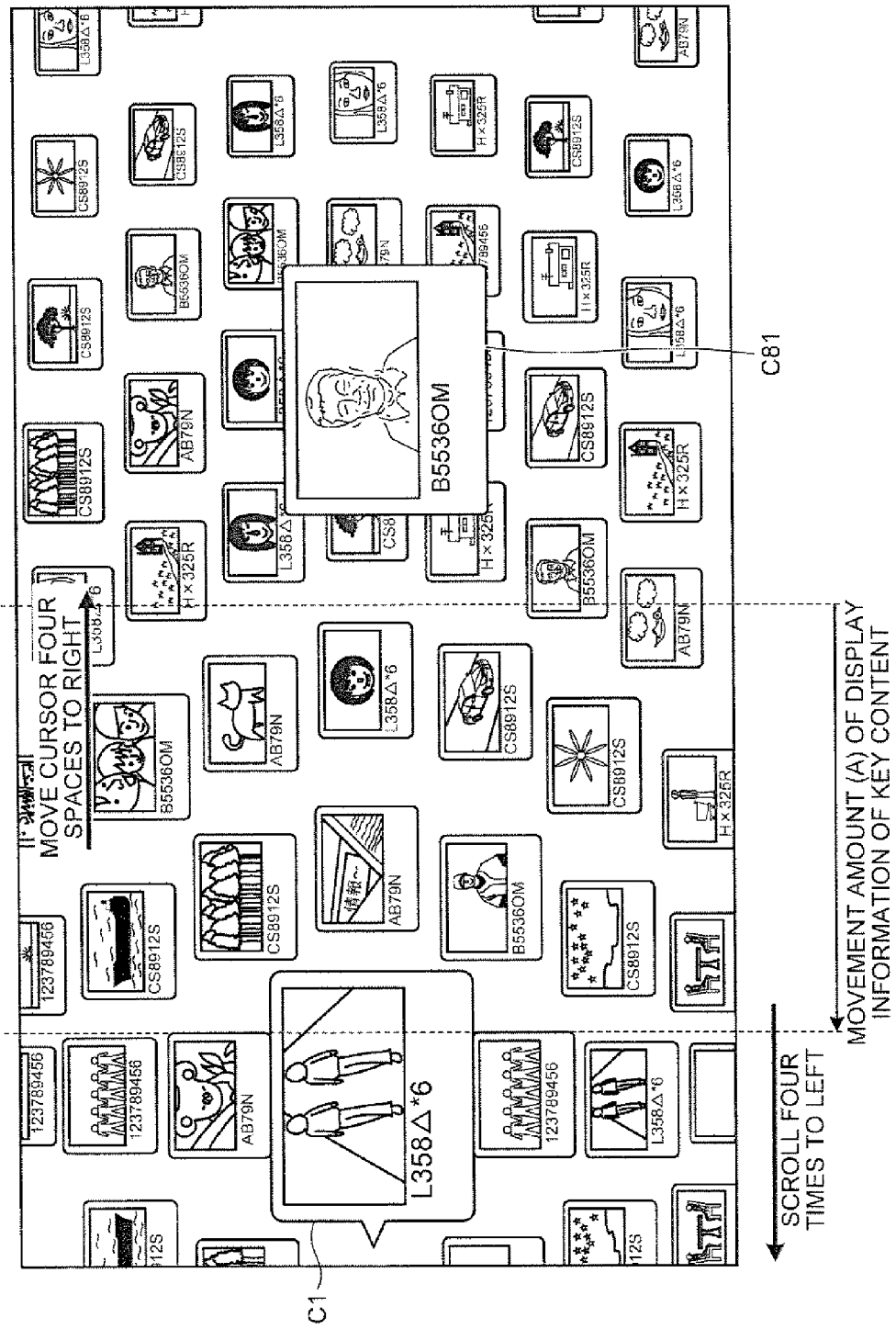

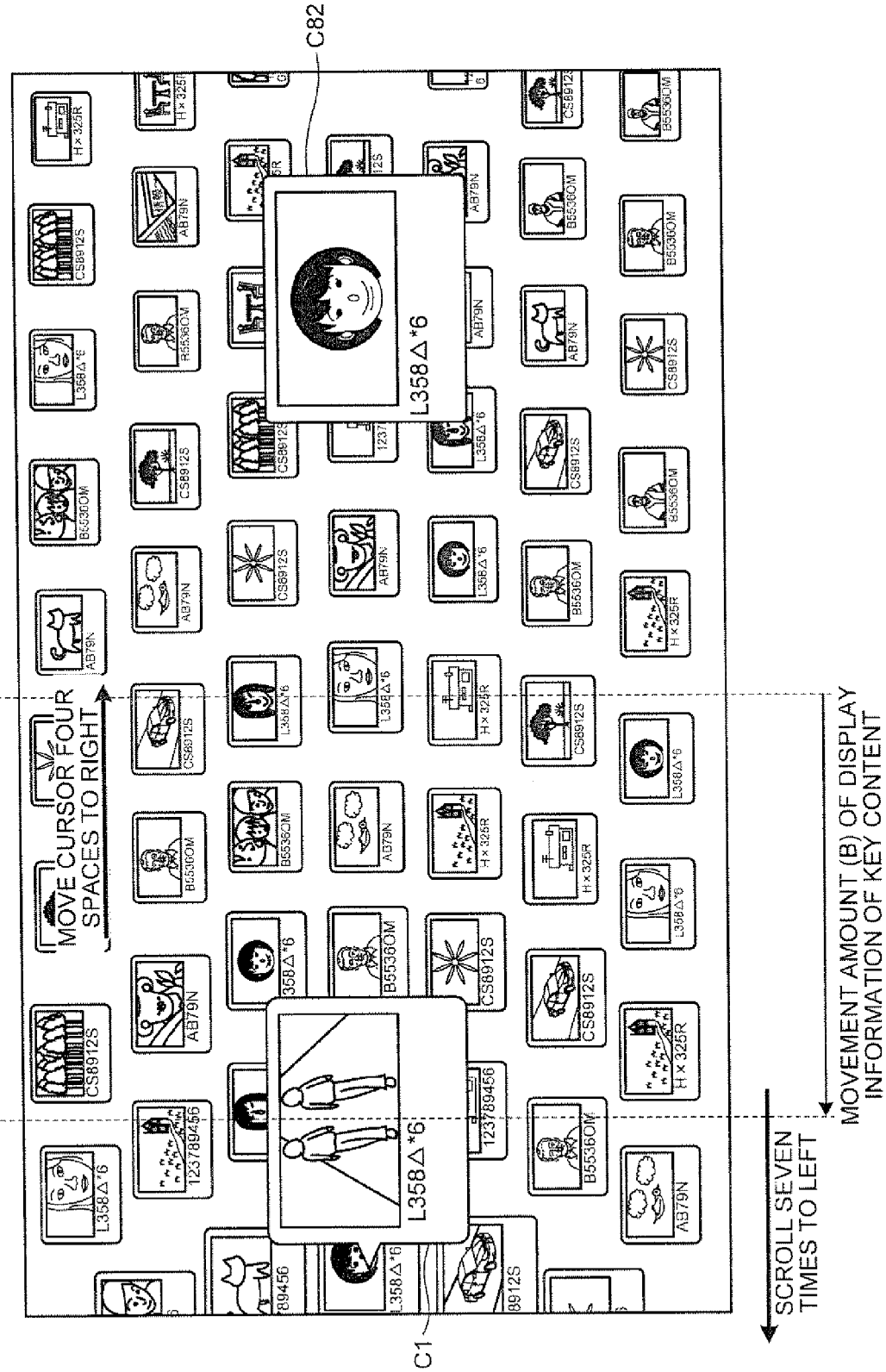

FIG.13A
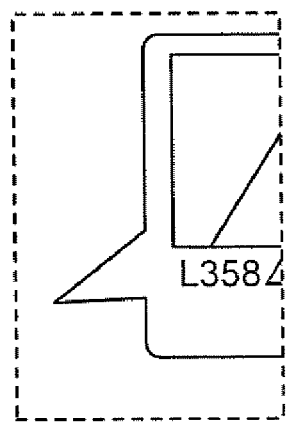
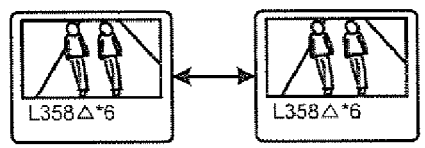
FIG.13B
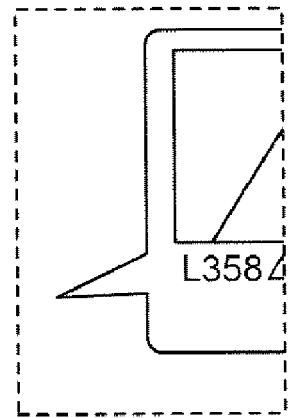

DISPLAY PROCESSING APPARATUS, DISPLAY PROCESSING METHOD, AND COMPUTER PROGRAM PRODUCT

CROSS-REFERENCE TO RELATED APPLICATIONS

This application is based upon and claims the benefit of priority from Japanese Patent Application No. 2008-220535, filed on Aug. 28, 2008, the entire contents of which are incorporated herein by reference.

BACKGROUND

1. Field

One embodiment of the invention relates to a display processing apparatus, a display processing method, and a computer program product.

2. Description of the Related Art

In recent years, with increased capability of AV equipment for storing contents and improved seamless accessibility of contents between equipment, let alone within the same equipment, or on a network, there has been a proliferation in the number of contents accessible to users. Accordingly, for example, Japanese Patent Application Publication (KOKAI) No. 2001-292383 discloses a conventional receiving device that allows users to select and view such contents.

With the conventional receiving device, in response to user selection of content from a list of contents, the content desired by the user is displayed. When the content selected by the user is stored in the device, the content is read and displayed on its data display module. On the other hand, when the content is present outside the device, the content is received from the outside and displayed on the data display module.

Besides, a recent increase in the capacity of storage media such as a hard disk drive (HDD) provided to AV equipment increases steps to retrieve content that a user desires to view. If what is to be displayed includes video audio data (contents) on a network, then, the number of search objects further increases. This makes it difficult to retrieve display information of contents related to the content that the user desires to view.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is an exemplary schematic diagram of metadata when a TV program is content in the embodiment;

FIGS. 3A and 35 are exemplary schematic diagrams of display information representing the details of the content in the embodiment;

FIGS. 5 to 8 are other exemplary schematic diagrams for explaining the operation of displaying the display information in the embodiment;

FIG. 9 is an exemplary schematic diagram of list information in which are arranged display information of key content and that of other contents in the embodiment;

FIGS. 11A to 11C are exemplary schematic diagrams for explaining the scrolling of the list information in which are arranged the display information of the key content and that of other contents in the embodiment;

FIGS. 13A and 13B are exemplary schematic diagrams for explaining direction indication indicating the direction of an initial display position of the display information of the key content in the embodiment;

DETAILED DESCRIPTION

Figure 1:
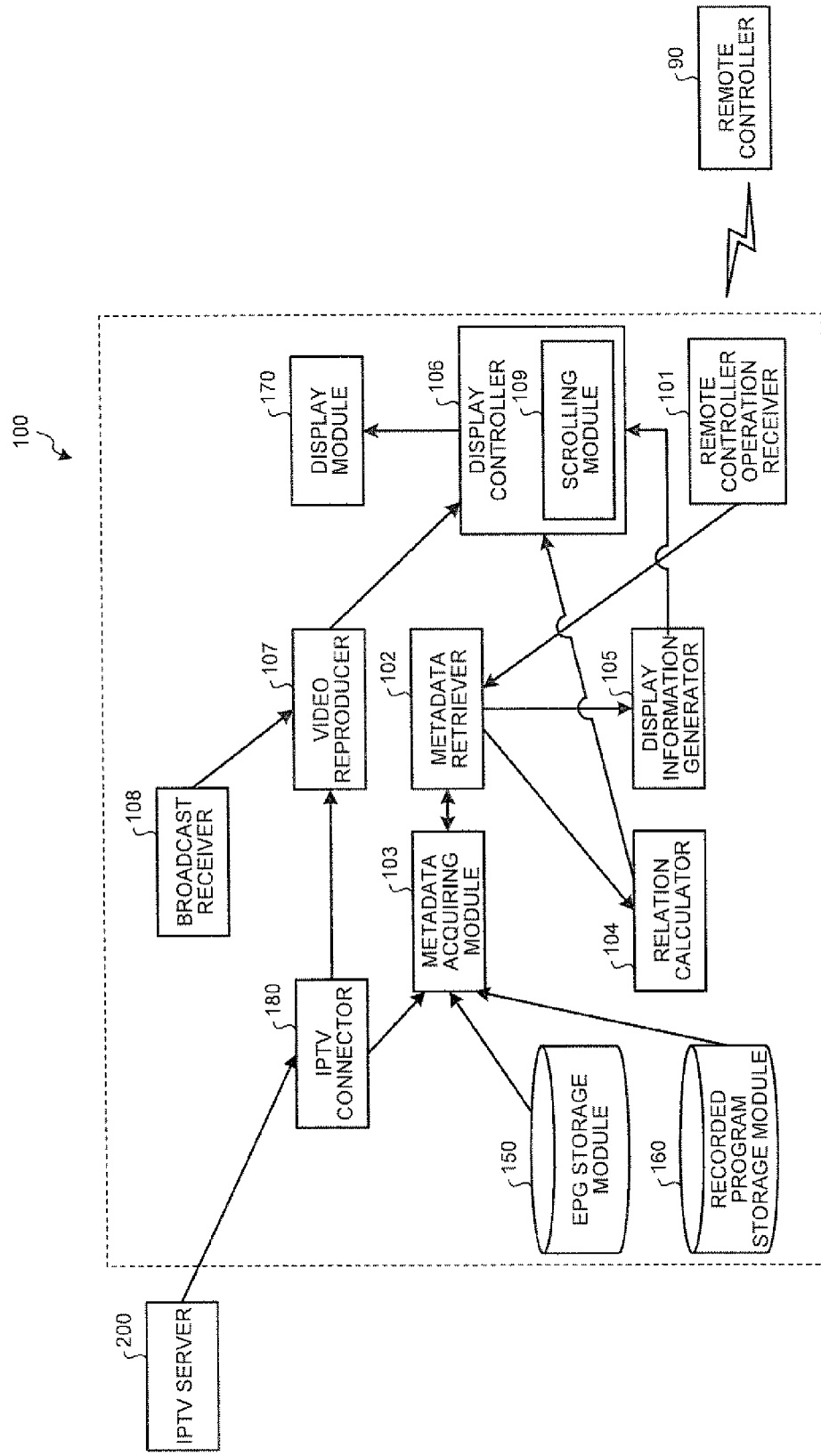
FIG. 1 is an exemplary block diagram of a display processing apparatus according to an embodiment of the invention.

Various embodiments according to the invention will be described hereinafter with reference to the accompanying drawings. In general, according to one embodiment of the invention, a display processing apparatus comprises an operation receiver, a display information generator, a display controller, and a scrolling module. The operation receiver is configured to receive operation to select a key content as a search key. The display information generator is configured to generate display information indicating the key content and display information indicating other contents related to the key content. The display controller is configured to display list information including the display information of the key content at a predetermined position and pieces of the display information of the other contents. The scrolling module is configured to scroll the list information in a predetermined display range, when an initial display position where the display information of the key content is initially displayed moves outside the display range, the display controller displays the display information of the key content with direction information indicating direction of the initial display position in the display range.

According to another embodiment of the invention, a display processing method comprises: an operation receiver receiving operation to select a key content as a search key; a display information generator generating display information indicating the key content and display information indicating other contents related to the key content; a display controller displaying list information including the display information of the key content at a predetermined position and pieces of the display information of the other contents; and a scrolling module scrolling, the list information in a predetermined display range. When an initial display position where the display information of the key content is initially displayed moves outside the display range, the display controller displays the display information of the key content with direction information indicating direction of the initial display position in the display range.

According to another embodiment of the invention, a computer program product comprises a computer usable medium having computer readable program codes embodied in the medium that, when executed, causes a computer to implement the above display processing apparatus.

Although a display processing apparatus of the embodiments is described below as being applied to a television (TV), this is by way of example only and is not to be construed to be limiting. The display processing apparatus may be applied to any display device capable of displaying video or the like. Briefly, in the following embodiments, when a user retrieves content related to a key content as a search key from a plurality of contents, the display processing apparatus displays the key content with contents related to the key content in response to user selection of the key content.

A description will be given of the functional configuration of a display processing apparatus 100 according to an embodiment of the invention. FIG. 1 is a block diagram of the display processing apparatus 100. As illustrated in FIG. 1, the display processing apparatus 100 comprises an electronic program guide (EPG) storage module 150, a recorded program storage module 160, a display module 170, a broadcast receiver 108, and an Internet protocol television (IPTV) connector 180. The display processing apparatus 100 is connected to an IPTV server 200 via a network. Although not illustrated, the display processing apparatus 100 further comprises a processor, such as ASIC or CPU, and a storage device. The storage device includes a ROM that stores a predetermined computer program for controlling the display processing apparatus 100 and a RAM that provides a work area for the processor. The cooperation of the processor and the computer program stored in the storage device implements functional modules including the EPG storage module 150, the recorded program storage module 160, a remote controller operation receiver 101, a metadata retriever 102, a metadata acquiring module 103, a relation calculator 104, a display information generator 105, a display controller 106, and a video reproducer 107.

The IPTV server 200 provides services to distribute video such as TV programs and movies using IP. In response to a request from the display processing apparatus 100, the IPTV server 200 delivers thereto content such as the video and metadata of the content.

The IPTV connector 180 is an interface that connects the display processing apparatus 100 and the IPTV server 200.

The EPG storage module 150 is a storage medium such as HOD or memory for storing an electronic program guide obtained from an external server that manages and distributes the electronic program guide. More specifically, the EPG storage module 150 obtains via a communication module (not illustrated) an electronic program guide for TV, CATV, CS broadcasting, BS broadcasting, and the like from a service provider server connected through a network such as the Internet, and stores the electronic program guide. It is assumed herein that the electronic program guide contains information on programs to be broadcasted within a period from the present time to a certain time in the future (e.g., after one week).

The recorded program storage module 160 is a storage medium such as HDD or memory for storing content such as video. For example, if the display processing apparatus 100 is TV with HDD, the recorded program storage module 160 stores video of a recorded TV program as the content. Examples of the content include video in a digital versatile disk (DVD) and video captured by a video camera.

The recorded program storage module 160 also stores metadata related to the content in association therewith. The term "metadata" as used herein refers to a set of information indicating unique characteristics of the content. The unique characteristics include the title of the content and the broadcast date and time of the content. For example, if the content is a TV program, the metadata indicates information (program information) on the TV program such as the title, the channel/broadcast date and time, the cast, the brief description (subtitle), and the genre. This metadata is provided to the recorded program storage module 160 with the content and stored therein in association with the content.

FIG. 2 illustrates the metadata when a TV program is the content. The metadata illustrated in FIG. 2 represents information related to the content of a recorded TV program. The information, such as the title of the TV program "Noon Comedy Show", the channel "00", the broadcast date and time "Aug. 1, 2008, 12:00-12:40", the cast "xxxxx, yyyyy", the subtitle "Great line up of comedians invite you to enjoy a noon of hilarious entertainment", and the genre "comedy", is stored as metadata.

Although an example is described above in which the metadata is provided as being preset, this is by way of example and not of limitation. The recorded program storage module 160 may receive information provided by a user thorough an input device 90 such as a remote controller and store it as metadata in association with the content.

The display module 170 includes, for example, a liquid crystal display (LCD) for displaying text and an image, and displays content of a received TV program, stored content, an electronic program guide, and the like. The display module 170 also displays display information representing the details of the content generated by the display information generator 105, which will be described later, to allow a user to retrieve content (see FIGS. 3A and 3D).

The broadcast receiver 108 receives the content of video (TV program) broadcasted by TV broadcasting through an antenna or a cable (not illustrated).

The video reproducer 107 acquires the content of video that a user desires to reproduce. Examples of the content include the content of a TV program, etc. received by the broadcast receiver 108, the content of video acquired from the IPTV server 200 through the IPTV connector 180, and the content of video stored in the recorded program storage module 160. The video reproducer 107 decodes (reproduces) the content thus acquired, and outputs it to the display controller 106.

The remote controller operation receiver 101 receives user's operation. More specifically, when a user presses an operation button on the remote controller 90, the remote controller operation receiver 101 recognizes the event. For example, when a user retrieves desired content as well as contents related to the desired content from a plurality of contents, the user operates an operation button on the remote controller 90 to select content (key content) as a search key from a plurality of contents of the electronic program guide displayed on the display module 170. The remote controller operation receiver 101 receives this selection operation, i.e., an instruction to retrieve contents. The key content may be content that is being reproduced. In this case, the user presses an operation button on the remote controller 90 while the content is being reproduced. Thus, the remote controller operation receiver 101 receives this operation to select the content being reproduced as a key content, i.e., an instruction to retrieve contents. The remote controller operation receiver 101 also receives an instruction as to display information of content of current interest in list information indicating display information of a plurality of contents displayed on the display module 170. The details will be described later.

The metadata acquiring module 103 acquires, when the remote controller operation receiver 101 receives selection operation for key content, meta data of all contents (the key content and other contents of a plurality of types including a type different than the key content). More specifically, for example, the metadata acquiring module 103 acquires the metadata of the contents from the recorded program storage module 160. The metadata acquiring module 103 may request the IPTV server 200 for the metadata of the contents and acquire the metadata. The metadata acquiring module 103 may also acquire the metadata of the contents from the electronic program guide stored in the EPG storage module 150.

The metadata retriever 102 retrieves, when the remote controller operation receiver 101 receives selection operation for the key content, metadata of the key content from the metadata of the contents acquired by the metadata acquiring module 103. The metadata retriever 102 then outputs the metadata of the key content to the relation calculator 104. The metadata retriever 102 also retrieves, based on the metadata of the key content acquired from the metadata acquiring module 103, metadata of other contents to be the objects of calculation by the relation calculator 104 as to the relation to the metadata of the key content. The metadata retriever 102 then outputs the metadata of the other contents to the relation calculator 104.

The metadata retriever 102 also outputs, when the remote controller operation receiver 101 receives selection operation for the key content, metadata of all the contents acquired by the metadata acquiring module 103 to the display information generator 105.

The relation calculator 104 calculate the relation between the key content and the other contents based on the metadata of the key content and the metadata of the other contents received from the metadata retriever 102 for each item contained in the metadata. Examples of the item include title and channel. More specifically, the relation calculator 104 calculates relation RM using the following equation:

$$\text{relation } RM = \sum_{n-1}^{N} fa_n(M11(n), M21(n)) \times wa_n \qquad (1)$$

where N represents the total number of metadata items acquirable by the metadata acquiring module 103, M11 represents the metadata of the key content, M21 represents the metadata of the other contents, and (n) represents n-th metadata acquired by the metadata acquiring module 103. Further, $fa_n(M11(n), M21(n))$ is a function that returns the relation between metadata $M11(n)$ and $M21(n)$ as $RM_n$, and $Wa_n$ is a value (n=1, ..., N) indicating weight.

As described above, although various types of information is acquired as the metadata, the metadata will be described below as including five items (N=5), i.e., recoding date and time, title of content, channel, genre, and cast, for simplicity. The five items of the metadata will be described as n=1, 2, ..., 5 in the above order.

The relation RM of the other contents with respect to the key content can be represented by the weighted linear sum of the following five relations $RM_1$ to $RM_5$:

$RM_1 = fa_1$ (recoding date and time of metadata M11, recoding date and time of metadata M21)

$RM_2 = fa_2$ (title of metadata M11, title of metadata M21)

$RM_3 = fa_3$ (channel of metadata M11, channel of metadata M21)

$RM_4 = fa_4$ (genre of metadata M11, genre of metadata M21)

$RM_5 = fa_5$ (cast of metadata M11, cast of metadata M21)

For example, $fa_1$ is a function that is larger for more recent recoding date and time and is smaller for less recent recoding date and time. More specifically, $fa_1$ may be represented by using a relational expression as follows:

$$MO1/|rec\_data(M11) - rec\_data(M21)|$$

where rec_data (x) is a function that uniquely converts recoding date and time of x into an integer, MO1 is an arbitrary constant number, and |X| is a function indicating the size of X and is typically an absolute value. Specifically, rec_data (x) is a function that converts the recoding date and time into an integer such as seconds having elapsed from a reference date and time determined as 0.

While an example is described above in which a function g represented as $g(x) = MO1/|X|$ is applied to $fa_1(M11, M21) = g(rec\_data (M11) - rec\_data (M21))$, it is not so limited. The function g may be a function with L2 norm as, for example, $g(x) = MO1/\|x\|$. In this case, $\|x\|$ is the square root of the sum of squares of the differences between elements that constitute x.

Other functions such as a sigmoid function and a gamma function may be applied to g(x). Besides, while an example is described above in which the function is larger as the recoding date and time of the metadata M11 and M21 is more recent, it is not so limited. The function may be smaller as the recoding date and time of the metadata is more recent. Further, the function g may be large when a specific condition is satisfied.

For example, $fa_2$ is a function that is larger as more of the same letters or characters are contained in the character strings of the titles of the respective metadata M11 and M21. More specifically, if the title of the metadata M11 is "ABCDE" and that of the metadata M11 is "FGCDH", two letters "CD" are contained in both the titles. If the title of the metadata M11 is "ABCDE" and that of the metadata M11 is "FGHIE", one letter is contained in both the titles. Therefore, the value of $fa_2$ is larger in the former case. The relation may be determined based on a keyword contained in the brief description (subtitle) of a program in the same manner as the title basis.

While an example is cited above in which the number of the same letters or characters contained in both the titles are simply compared, this is not intended as a limitation. Additional conditions may be used such as that the function is larger as more of the same letters or characters are contained in both the titles from the top, or that even if no same letter is present in both the titles, when the titles have a common idea, they are determined to be the same. As an example of the latter case, a Japanese word "yakyu" is regarded as the same as "baseball", and the titles that contain the words "yakyu" and "baseball", respectively, are determined to contain the same character string.

Besides, when the titles have the same main character string and different sub character strings, they are likely to be of contents of the same series. Accordingly, in such a case, the value of $fa_2$ may be set to large. Specifically, for example, "ABCDE #2" and "ABCDE #3" are likely to be the titles of different episodes of the same drama series. Therefore, in such a case, the value of $fa_2$ may be doubled. Note that the above is described by way of example only, and the comparison as described above may be accomplished with high accuracy by commonly known technologies such as approximate pattern matching and regular expression matching.

For example, $fa_3$ is a function that is large when the metadata M11 and M21 are of contents of the same channel. Simply, $fa_3$ may be a function that takes value MO2 when the metadata and M21 are of contents of the same channel and otherwise takes value 0. The value MO2 is an arbitrary constant number. In addition, if the metadata M11 and M21 are of contents of affiliate channels, the value of $fa_3$ may be set to a different value. For example, $fa_3$ may be a function that returns value MO2/2 when the metadata and M21 are of contents of affiliate channels. Further, $fa_3$ may be a function that returns value MO2/4 if the metadata and M21 are of contents of affiliate channels but of different broadcast media. Note that the above is described by way of example only, and $fa_3$ may be an arbitrary function.

For example, $fa_4$ is a function that is large when the metadata M11 and M21 are of contents of the same genre. More specifically, $fa_4$ may be a function that takes value MO3 if the metadata M11 and M21 both belong to the same genre "sports" and otherwise takes value 0. In addition, if the metadata M21 belongs to the subgenre of the metadata M11 such as, for example, if the metadata M11 belongs to the genre "sports" and the metadata belongs to the genre "baseball", $fa_4$ may be a function that takes value MO3/2. Further, even if the metadata M11 and M21 do not directly belong to the same genre, when they can be categorized in the same genre such as, for example, when the metadata M11 belongs to the genre "baseball" while the metadata M21 belongs to the genre "football" and the both are categorized in sports, $fa_4$ may be a function that takes value MO3/4. Note that the above is described by way of example only, and $fa_4$ may be an arbitrary function.

For example, $fa_5$ is a similar function to $fa_4$. More specifically, if the metadata M11 is of the content featuring "WW, XX, YY" and the metadata M21 is of the content featuring "XX, YY, ZZ", then the same two persons are casted for both the contents. In such a case, $fa_5$ may be a function that takes value 2×MO4 (MO4: an arbitrary constant number), and it may be a function that takes value 0 if there is no same person casted for both the contents. Besides, someone in the cast may be a member of a group. For example, if a person KK is a member of a group XX, and when the metadata M11 is of the content featuring "VV, WW, XX" and the metadata M21 is of the content featuring "KK, YY, ZZ", the person KK is casted in the content of M11 as a member of the group XX and also is casted in the content of M21. In such a case, $fa_5$ may be a function that returns value MO4/2.

In a similar fashion, the relation between groups or between people featured in the contents may be defined. For example, when the groups XX and YY belong to the same office, $fa_5$ may be a function that returns value MO4/4. In this case, the relation between groups or between people may be defined in the metadata or may be obtained from an external server (information site).

While an example is described above in which the relation is calculated not taking into account a person in the cast list, this is not so limited. The relation may further be weighted according to the order on the cast list. For example, the derived relation is left as it is with respect to the first person on the cast list for the metadata M11, while it is weighted by ½ with respect to the second person and similarly is weighted by ⅓ with respect to the third person. The order on the cast list for the metadata M21 may also be taken into account in addition to that for the metadata M11. For example, in comparison of the second person on the cast list for the metadata M11 with the third person on the cast list for the metadata M21, the relation may be weighted by ½ with respect to the second person for the metadata M11 and may further be weighted by ⅓ with respect to the third person for the metadata M21. That is, the relation may be weighted by ½×⅓=⅙. Besides, the relation may be weighted differently with respect to a star playing a leading role based on information on the cast or the like. For example, the derived relation may be double-weighted with respect to the star.

The display information generator 105 generates display information representing the details of the key content and the other contents based on the metadata of the key content and that of the other contents output from the metadata retriever 102. More specifically, for example, based on the metadata of content of video data stored in the recorded program storage module 160, the display information generator 105 adds such items as a title to the representative image of the video data to generate display information to be displayed on the display module 170. Further, for example, based on the metadata of content of video data obtained from the IPTV server 200, the display information generator 105 adds such items as a title to the representative image of the video data to generate display information to be displayed on the display module 170. Still further, for example, based on the electronic program guide stored in the FOG storage module 150, the display information generator 105 generates display information to be displayed on the display module 170 to indicate the title of a TV program, the broadcast date and time, the channel, the brief description of the TV program, and the like.

The display information will now be described in detail. FIGS. 3A and 3B illustrate examples of the display information representing the details of content. FIG. 3A illustrates display information C1 of the key content generated based on, for example, the metadata of video data stored in the recorded program storage module 160. As illustrated in FIG. 3A, the display information C1 includes a representative image C1-1 of the content and title "L358Δ*6" C1-2 of the content (video). On the other hand, FIG. 3B illustrates the display information C1 of the key content generated based on, for example, the electronic program guide. As illustrated in FIG. 3B, the display information C1 includes the channel C1-3, title "Noon Comedy Show" with subtitle "Great line up of comedians invite you to enjoy a noon of hilarious entertainment" C1-4 of the content (video), and broadcast date and time C1-5.

The display controller 106 reproduces and displays, upon receipt of content output from the video reproducer 107, the content on the display module 170.

As described above, when the remote controller operation receiver 101 receives an instruction from a user to retrieve content, the display controller 106 displays list information indicating display information of key content and that of other contents related to the key content.

In the list information, the display information of the key content is arranged in a desired position. With the position of the display information of the key content as the center, pieces of the display information of the other contents are arranged to form concentric polygons correspondingly to the directions of an operation button such as an arrow key on the remote controller 90. The screen is divided into predetermined areas for respective items in radial directions from the center. The pieces of the display information of the other contents are arranged in the predetermined areas such that the one with higher relation is closer to the center. Additionally, in the list information, the display information of the key content is displayed in the largest size, and the display information of the other contents is displayed smaller as the distance from the center increases. A description will be given of the operation of displaying the display information. FIGS. 4A to 8 are schematic diagrams for explaining the operation of displaying the display information.

Figure 4A:
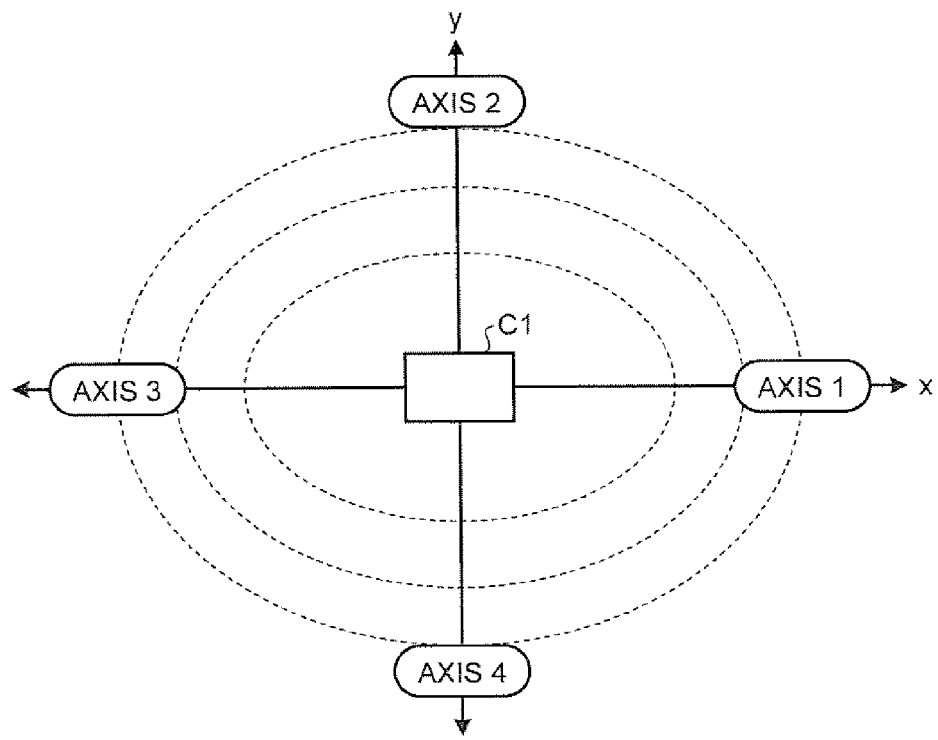
FIGS. 4A and 4B are exemplary schematic diagrams for explaining the operation of displaying the display information in the embodiment.

As illustrated in FIG. 4A, the display controller 106 arranges the display information C1 of the key content at a desired position. The display controller 106 then sets, using the position of the display information C1 as the center, four axes (axis 1 to 4) in the positive x-axis direction, the positive y-axis direction, the negative x-axis direction, and the negative y-axis direction, respectively. Thereafter, the display controller 106 assigns each item contained in the metadata of the selected key content to one of the four axes. Referring to FIG. 2, as items contained in the metadata, the "title" of a TV program (content), the "cast" of the TV program, a "keyword" for search contained in the brief description of the TV program, and the "genre" of the TV program are each assigned to one of the four axes. A user can use the items assigned to the axes as indices for searching contents related to the key content.

Figure 4B:
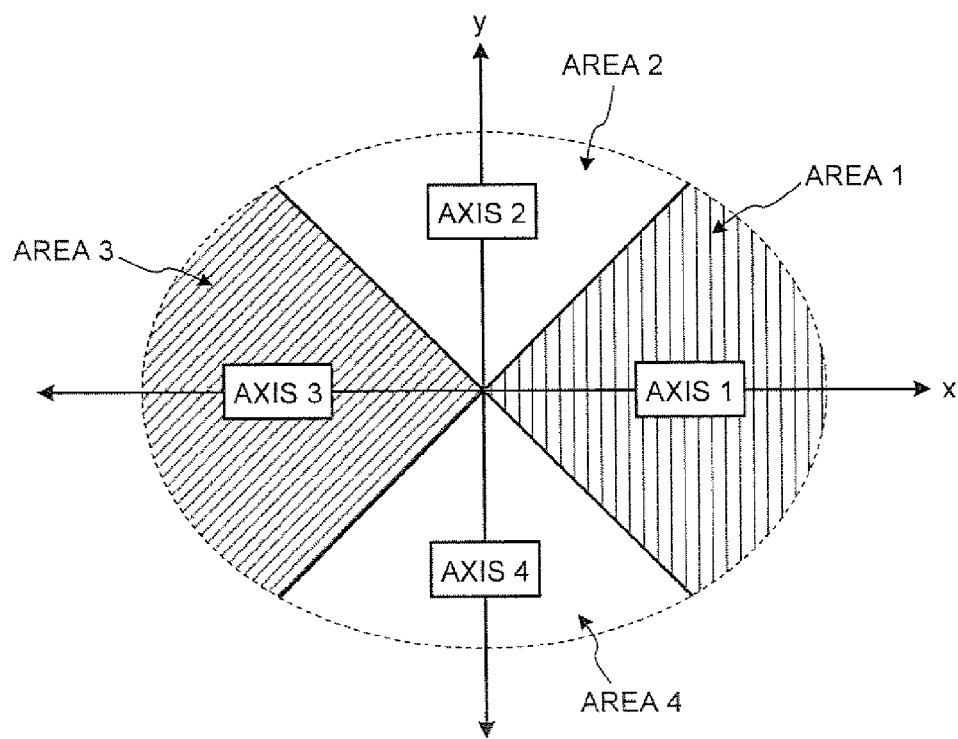

As illustrated in FIG. 4B, the display controller 106 divides the display area into predetermined areas (area 1 to 4) in radial directions from the display information C1 in the center. The display area is divided at an arbitrary angle, for example, an angle of 90° such that each of the predetermined areas includes one of the axes assigned one of the items. In this manner, the display controller 106 generates the predetermined areas (area 1 to 4) each including one of the axes.

As illustrated in FIG. 5, the display controller 106 then arranges pieces of display information of other contents on a plurality of octagons F1, F2, . . . , which are concentrically formed around the display information C1 of the key content as the center, correspondingly to up, down, left, and right directions of the operation button on the remote controller 90. More specifically, the display controller 106 arranges eight pieces of display information C11 to C18 of other contents on the octagon F1. Further, the display controller 106 arranges on the octagon F2 eight pieces of display information C21, C23, C25, C27, C29, C31, C33, and C35 of other contents, and also eight pieces of display information C22, C24, C26, C28, C30, C32, C34, and C36 of other contents between the respective pieces along the directions of the operation button. In the same manner as just described, the display controller 106 arranges on each octagon eight pieces of display information of other contents, and also arranges eight pieces of display information of other contents between the respective pieces. With this arrangement of display information of other contents, with respect to any piece of display information, other pieces of display information are arranged along the up, down, left, and right directions of the operation button.

At this time, as illustrated in FIG. 6, the display controller 106 arranges pieces of display information of other contents with higher relation to the key content closer to the center at which is arranged the display information C1 of the key content. In other words, pieces of display information of other contents with lower relation to the key content are arranged more distant from the center. That is, in the example of FIG. 5, the display controller 106 arranges pieces of display information of other contents with the highest relation to the key content on the octagon F1. The display controller 106 also arranges pieces of display information of other contents in descending order of relation to the key content on the octagon F2, and other octagons (not illustrated).

In addition, the display controller 106 arranges pieces of display information of other contents in descending order of relation to the key content in each of the predetermined areas previously obtained for each item. More specifically, as illustrated in FIG. 7, for respective items assigned to the area 1 defined by boundary lines B1 and B4, the area 2 defined by boundary lines B1 and B2, the area 3 defined by boundary lines B2 and B3, and the area 4 defined by boundary lines B3 and B4, the display controller 106 arranges pieces of display information of other contents in the order of numbers assigned to the pieces. Thus, with respect to each of the items, the pieces of the display information of the other contents can be arranged from around the center in descending order of relation to the key content.

In the example of FIG. 7, pieces of the display information C11, C21 and C41 are located in positions that may belong to both the areas 1 and 2. For example, the pieces of the display information C11, C21 and C41 can be set to belong to either one of the areas or items in which more contents with relation to the key content higher than a predetermined threshold are present than in the other. In FIG. 7, since more other contents with relation higher than the predetermined threshold are present in the area 2 than in the area 1, the pieces of the display information C11, C21 and C41 belong to the area 2. The same is applied to pieces of the display information C13, C25, C47, C15, C29, C53, C17, C33, and C59.

While an area to which display information displayed near a boundary line belongs is described above as being determined based on the decree of relation to the key content, this is by way of example and not of limitation. For example, display information displayed near a boundary line may belong to an area having more contents related to the key content than the other.

Further, as illustrated in FIG. 8, the display controller 106 displays the display information of the key content in the largest size, and the display information of the other contents smaller as the distance from the center increases. When display information of another content belongs to a plurality of areas, the display controller 106 displays the display information in one of the areas. More specifically, when display information of another content belongs to the areas 1 and 2, the display information is displayed in only one area assigned an item with respect to which the other content has higher relation to the key content.

In this manner, the display controller 106 generates list information in which are arranged the display information C1 of the key content and the display information C11, . . . of the other contents, and displays the list information on the display module 170. Incidentally, the display controller 106 stores in advance the display position and size of the display information, and, after the calculation of the relation to the key content, sequentially arranges pieces of the display information of the other contents each in a predetermined size. FIG. 9 illustrates an example of the list information in which are arranged the display information C1 of the key content and the display information C11, of the other contents. In the list information of FIG. 9, items "Title", "Cast", "Keyword", and "Genre" are displayed on the upside, right side, downside, and left side of the screen, respectively. Further, with the display information C1 of the key content as the center, pieces of the display information of the other contents are arranged from around the center toward the outside.

As described above, according to the embodiment, pieces of display information of other contents are arranged along up, down, left, and right directions of an operation button. Therefore, in the example of FIG. 9, upon receipt of an instruction for left-right movement through the operation button, the focus in retrieval on the display information C30 moves in directions indicated by a double-head arrow A. Similarly, upon receipt of an instruction for up-down movement through the operation button, the focus in retrieval on the display information C30 moves in directions indicated by a double-head arrow B. Additionally, for example, if the cursor moves one space to the right in response to an instruction when the focus is on the display information C11, the focus moves to the display information C36. Similarly, if the cursor moves one space in the up, left, or down direction in response to an instruction, the focus moves from the display information C11 to the display information C22, C12, or C18. Thus, the operation using the operation button such as an arrow key on the remote controller 90 can be facilitated.

Figure 10:
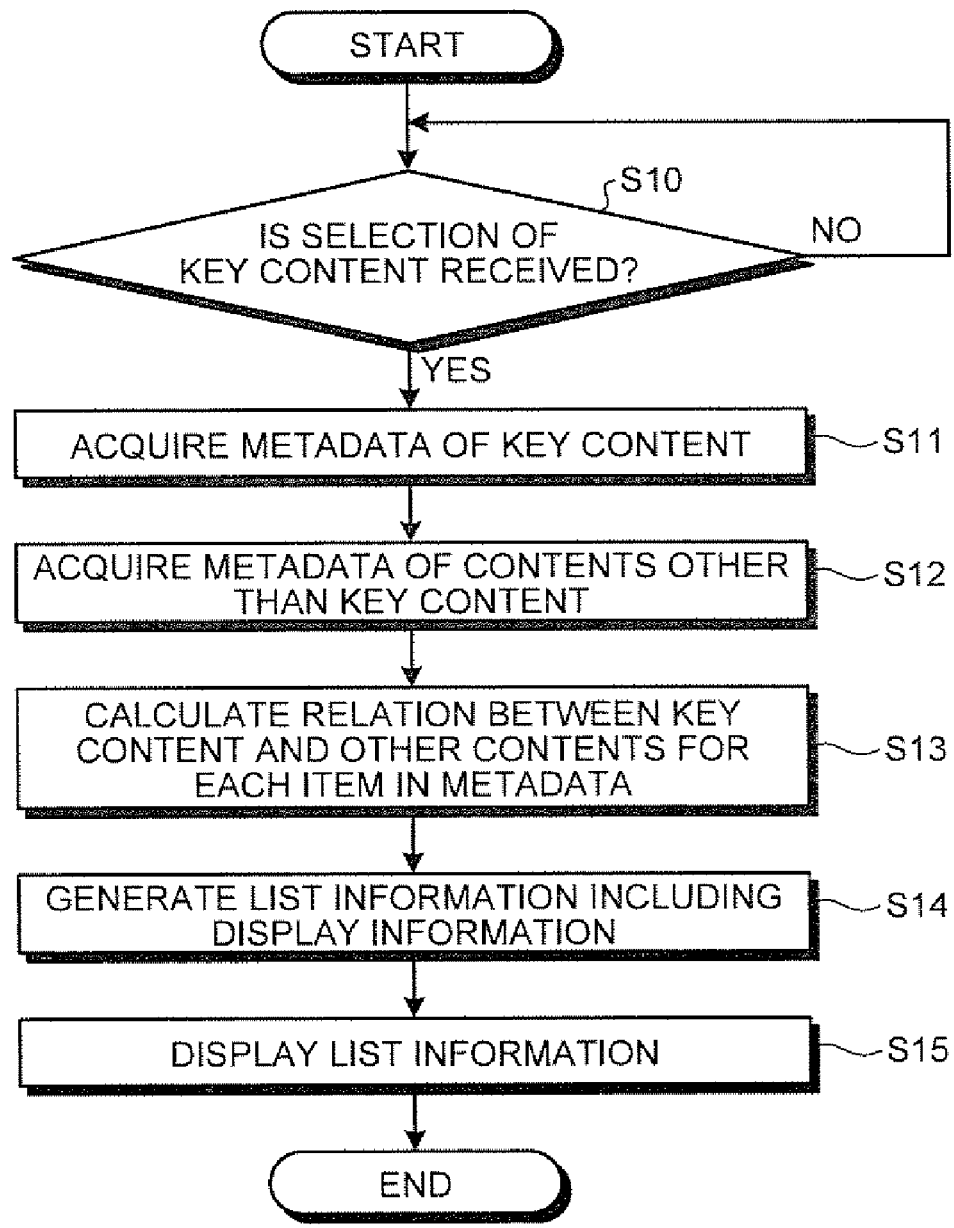
FIG. 10 is an exemplary flowchart of the process of displaying the display information performed by the display processing apparatus in the embodiment.

A description will now be given of the process of displaying display information performed by the display processing apparatus 100. FIG. 10 is a flowchart of the process of displaying the display information performed by the display processing apparatus 100.

The remote controller operation receiver 101 waits for receiving the selection of key content thorough an operation button on the remote controller 90 (S10). Upon receipt of the selection (Yes at S10), the metadata acquiring module 103 acquires metadata of the key content (S11). The metadata acquiring module 103 then acquires metadata of contents other than the key content (S12).

The relation calculator 104 calculate the relation between the key content and the other contents with respect to each item contained in the metadata (S13). The display controller 106 generates list information in which are arranged display information of the key content and display information of the other contents (S14). Pieces of the display information of the other contents are arranged according to their relation to the key content. The display controller 106 displays the list information on the display module 170 (S15).

As described above, the list information is displayed in which are arranged display information of key content as a search key and that of other contents related to the key content. In the list information, with the position of the display information of the key content as the center, pieces of the display information of the other contents are arranged to form concentric polygons along the directions of operation by the operation button. Pieces of display information of other contents with higher relation to the key content are arranged closer to the center. With this, by operating the remote controller 90, a user can easily retrieve content related to the key content from various types of contents.

Referring back to FIG. 1, the display controller 106 comprises a scrolling module 109. When the remote controller operation receiver 101 receives an instruction specifying display information of content of current interest (focused content) in response to the depression of an operation button on the remote controller 90, the scrolling module 109 scrolls the list information in the operation direction in a predetermined display range. At this time, regardless of the movement amount of the list information due to scrolling by the scrolling module 109, the display controller 106 maintains display information of key content to be displayed in the display range. Besides, the display controller 106 displays the display information of the focused content specified from other contents than the key content by the operation with the operation button in such a manner that the display information of the focused content is larger than that of the other contents not specified.

Figure 11A:
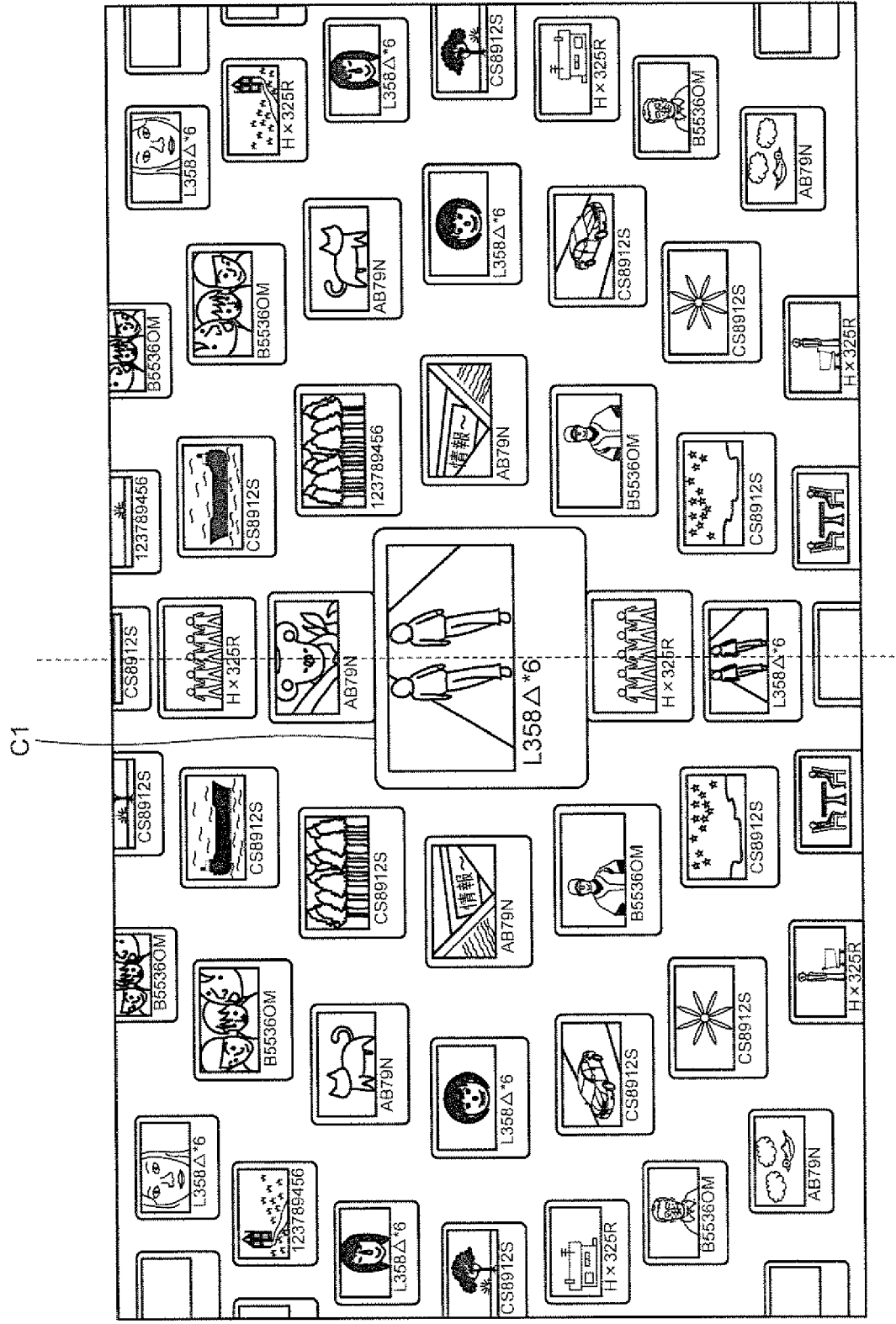

FIGS. 11A to 11C are schematic diagrams for explaining the scrolling of the list information in which are arranged the display information of the key content and that of the other contents. FIG. 11A illustrates the list information in the initial state in which the display information C1 of the key content is arranged in the center. In this state, the key content is focused content. At this point, for example, if a user presses the right arrow of the operation button four times, the cursor moves four spaces to the right. Accordingly, display information C81 of another content is displayed as display information of focused content, and the list information is scrolled four times to the left as illustrated in FIG. 11B. Incidentally, one-scroll movement amount is preset. After that, if the user further presses the right arrow of the operation button three times, the cursor moves three spaces to the right. Namely, the cursor has moved seven spaces from the initial state. Accordingly, display information C82 of another content is displayed as display information of focused content, and thus the list information has been scrolled seven times to the left as illustrated in FIG. 11C.

The display information C1 of the key content is maintained to be displayed in the display range even if its initial display position moves outside the display range. Suppose that the initial display position of the display information C1 moves outside the display range when the list information is scrolled four times to the left from the initial state. Then, the movement amount (A) of the display information C1 by scrolling four times to the left from the initial state is equal to the movement amount (B) of the display information C1 by scrolling seven times to the left. In both the cases, the display information C1 of the key content is displayed in the same position.

Figure 12:
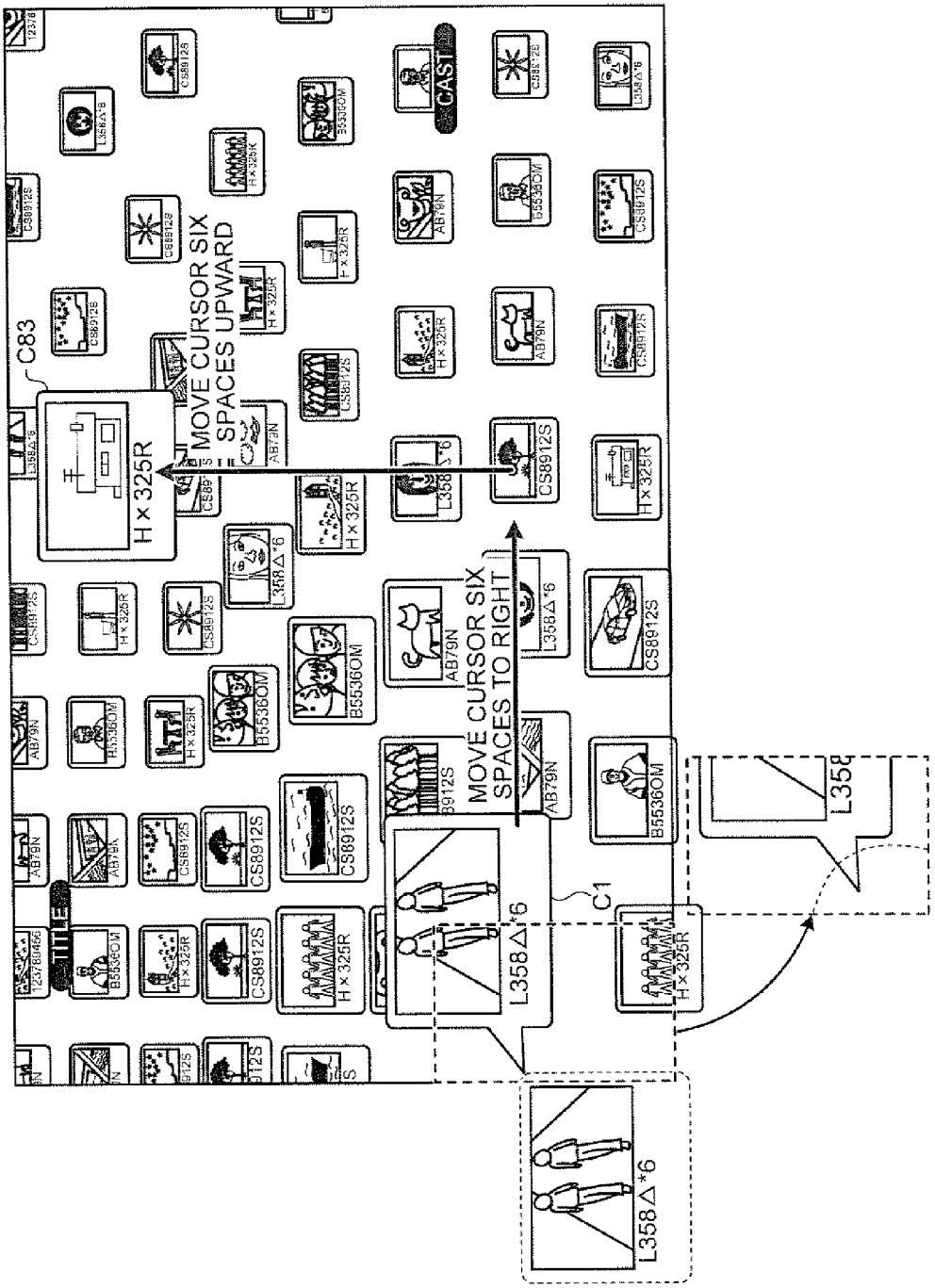
FIG. 12 is another exemplary schematic diagram for explaining the scrolling of the list information in which are arranged the display information of the key content and that of other contents in the embodiment.

If the initial display position of the display information C1 moves outside the display range when the list information is scrolled by the scrolling module 109, the display controller 106 displays the display information C1 with direction indication indicating the direction of the initial display position. FIG. 12 is another schematic diagram for explaining the scrolling of the list information in which are arranged the display information of the key content and that of the other contents. FIG. 12 illustrates the list information in which, in response to user's depression of the right arrow of the operation button six times and the up arrow six times, the cursor moves six spaces to the right and six spaces upward, and display information C83 of another content is displayed as display information of focused content. Due to this, it is assumed herein that the initial display position of the display information C1 moves in the lower left direction to the outside of the display range (see the display information located outside the display range in FIG. 12). Thus, the display controller 106 displays the display information C1 with direction indication in a substantially triangular shape as illustrated in FIG. 12. The direction indication points to the direction of the initial display position with one corner.

In addition, the display controller 106 displays the direction indication smaller as the distance between the current display position and the initial display position of the display information C1 increases. FIGS. 13A and 13B are schematic diagrams for explaining the direction indication indicating the direction of the initial display position of the display information C1 of the key content. As can be seen, the display controller 106 displays the direction indication larger when the current display position of the display information C1 is closer to the initial display position (see FIG. 13A) than when the current display position of the display information C1 is more distant from the initial display position (see FIG. 13B).

As described above, the direction indication is displayed in a size according to the distance between the current display position and the initial display position of the display information C1 of the key content. This allows a user to roughly estimate the distance between the current display position and the initial display position of the display information C1. While the direction indication is described above as varying in size according to the distance between the current display position and the initial display position of the display information C1, it may vary in color according to the distance to indicate the distance.

Figure 14:
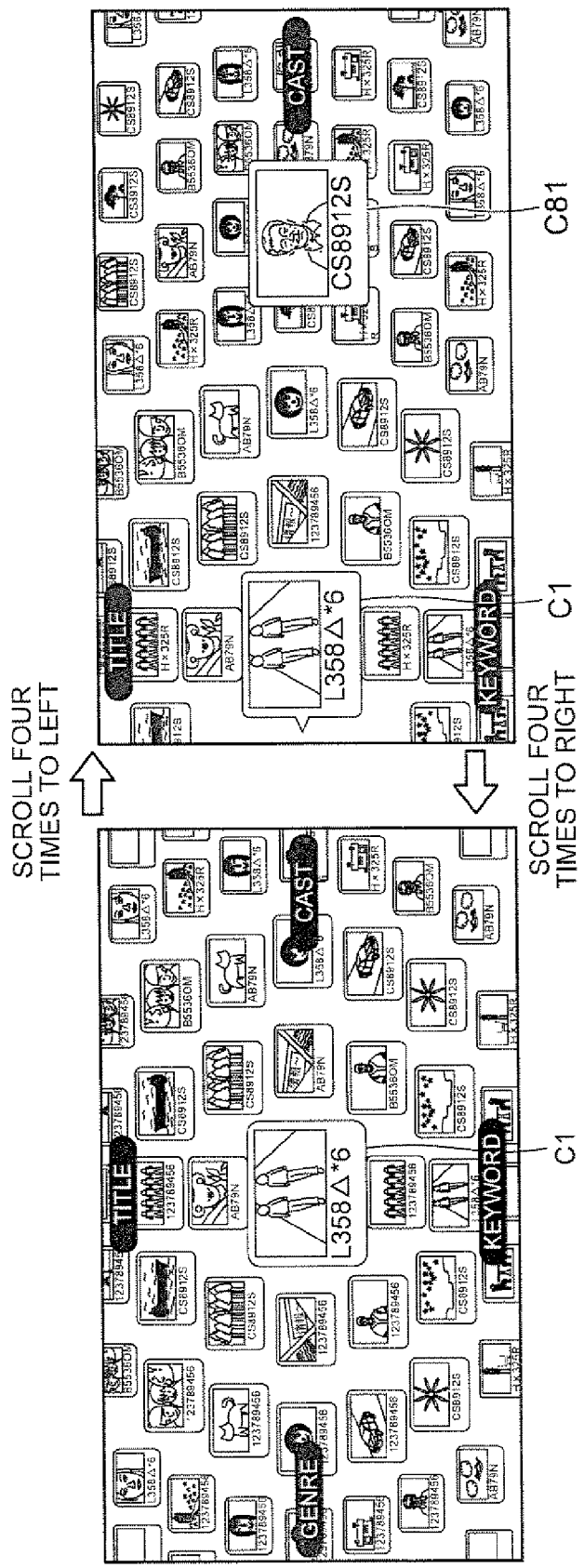
FIG. 14 is an exemplary schematic diagram for explaining the list information in which the number of items changes in a display range in the embodiment.

If there is a change in the number of items in the display range when the list information is scrolled by the scrolling module 109, the display controller 106 changes the display of the items according to the change. More specifically, when the list information is scrolled by the scrolling module 109, pieces of display information of other contents belonging to an item assigned to an axis may move from inside the display range to the outside. If this removes the item from the display range, the display controller 106 does not display the item on the display module 170. FIG. 14 is a schematic diagram for explaining the list information in which the number of items changes in the display range. As illustrated in FIG. 14, it is assumed that the list information is scrolled four times to the left from the initial state, and that all pieces of display information of other contents belonging to, for example, the item "Genre" assigned to the left axis move from inside the display range to the outside. Then, the display controller 106 does not display the item "Genre" on the display module 170.

On the other hand, when the list information is scrolled by the scrolling module 109, pieces of display information of other contents belonging to an item assigned to an axis may move from outside the display range to the inside. If this adds the item to the display range, the display controller 106 additionally displays the item on the display module 170. As illustrated in FIG. 14, it is assumed that the list information is scrolled four times to the right from a certain state, and that at least one piece of display information of another content belonging to, for example, the item "Genre" assigned to the left axis, moves from outside the display range to the inside. Then, the display controller 106 additionally displays the item "Genre" on the display module 170.

Figure 15:
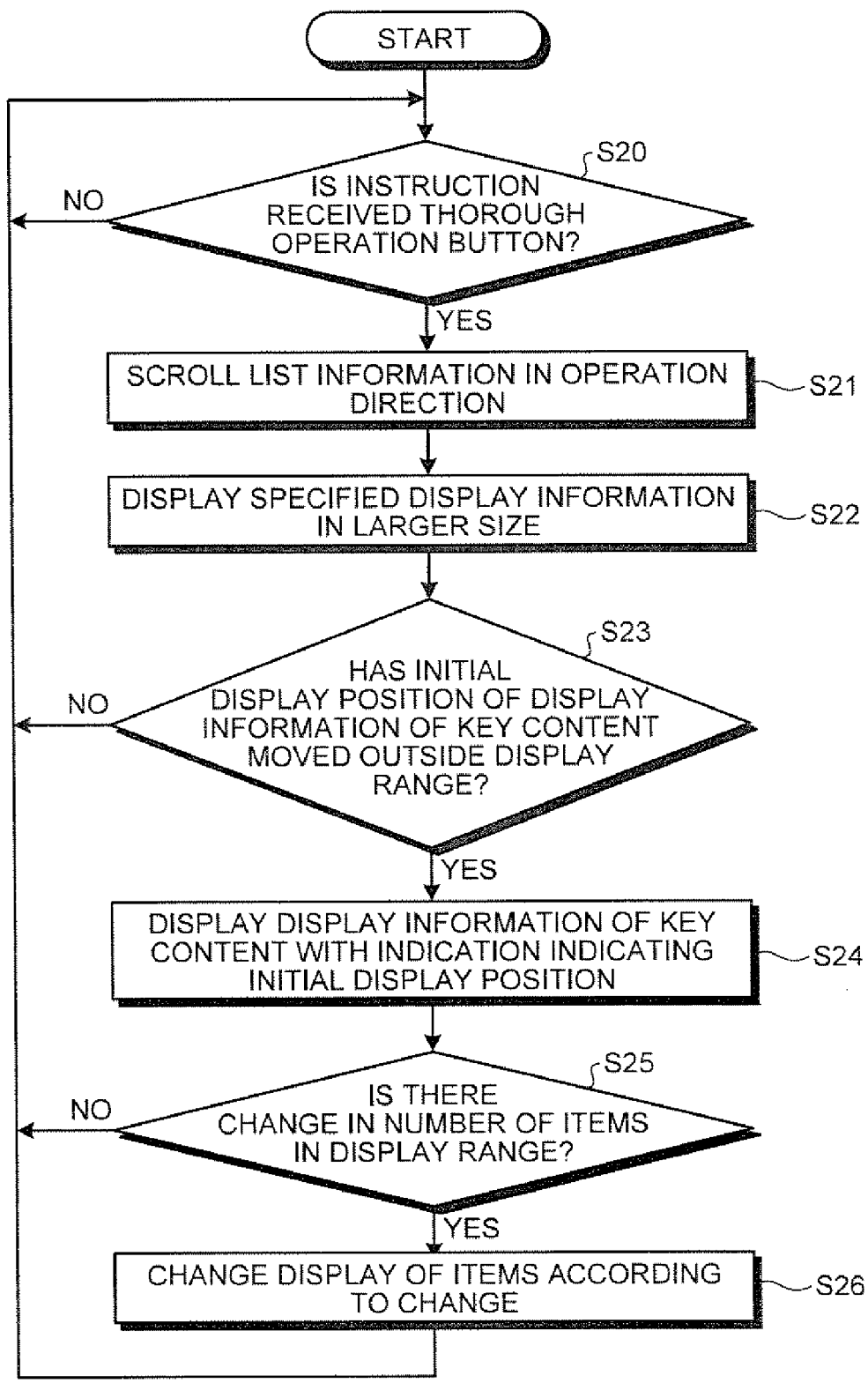
FIG. 15 is an exemplary flowchart of the process of scrolling the list information performed by the display processing apparatus in the embodiment.

A description will now be given of the process of scrolling the list information performed by the display processing apparatus 100. FIG. 15 is a flowchart of the process of scrolling the list information performed by the display processing apparatus 100.

The remote controller operation receiver 101 waits for receiving an instruction specifying display information of focused content thorough an operation button on the remote controller 90 (S20). Upon receipt of an instruction (Yes at S20), the scrolling module 109 scrolls the list information in the operation direction (S21). The display controller 106 displays the display information of the focused content specified by the operation with the operation button larger than that of the other contents not specified (S22).

Next, the display controller 106 determines whether the initial display position of display information of key content has moved outside the display range (S23). If the initial display position has not moved outside the display range (No at S23), the process returns to S20. On the other hand, if the initial display position has moved outside the display range (Yes at S23), the display controller 106 displays the display information of the key content with direction indication indicating the direction of the initial display position (S24).

Thereafter, the display controller 106 determines whether there is a change in the number of items in the display range (S25). If there is no change in the number of items (No at S25), the process returns to S20. On the other hand, if there is a change in the number of items (Yes at S25), the display controller 106 changes the display of the items according to the change (S26). That is, if an item has disappeared from the display range, the display controller 106 does not display the item. Meanwhile, if an item has appeared in the display range, the display controller 106 additionally displays the item.

Along with the transition of an image displayed on the screen of the display module 170, a description will be given of the process of scrolling the list information performed by the scrolling module 109. FIGS. 16 to 20 are schematic diagrams for explaining screen transition upon leftward scrolling of the list information in which are arranged display information of key content and that of other contents.

Figure 16:
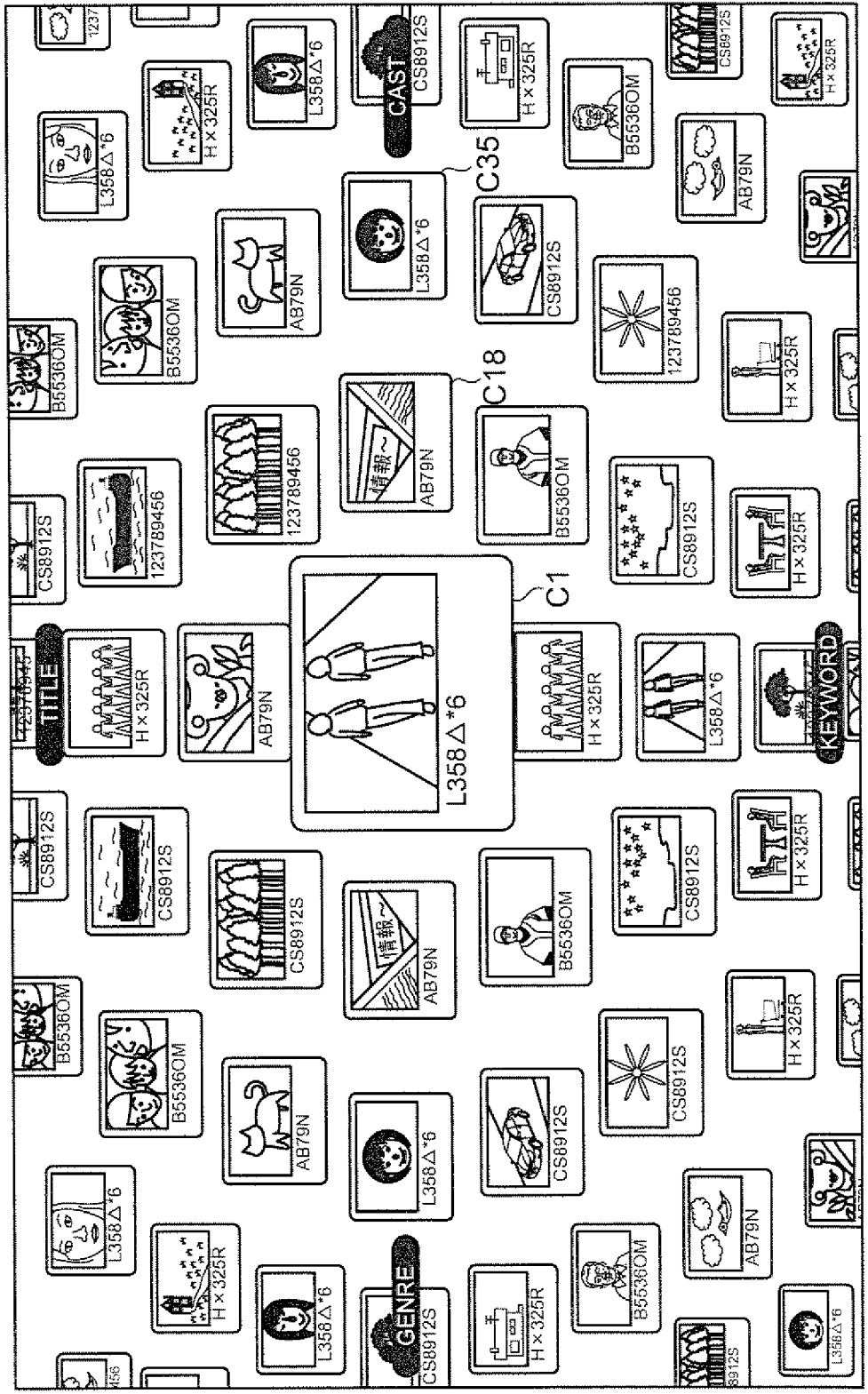
FIGS. 16 to 20 are exemplary schematic diagrams for explaining screen transition upon leftward scrolling of the list information in which are arranged the display information of the key content and that of other contents in the embodiment.

When the remote controller operation receiver 101 receives the selection of key content, as illustrated in FIG. 16, list information is displayed in which the display information C1 of the key content is arranged in the center thereof. In the list information, the key content is focused content, and the selection or focus is on the display information C1. This position of the display information C1 represents its initial display position.

Figure 17:
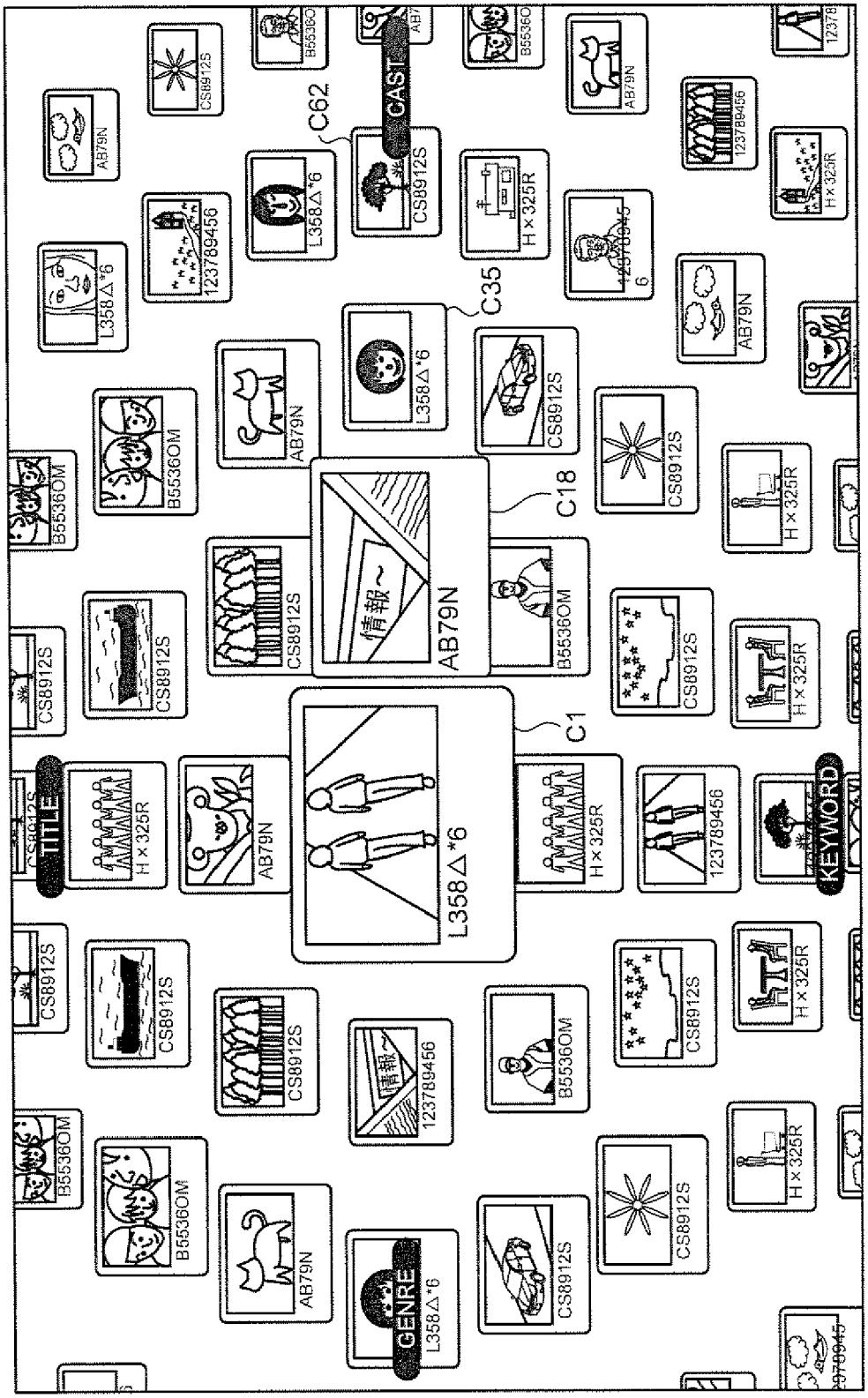

Then, when an instruction is received to move the selection or focus from the display information C1 of the key content to the display information C18 of another content, the cursor moves one space to the right, and also the list information is scrolled once to the left. Thus, the list information as illustrated in FIG. 17 is displayed on the display module 170.

Figure 18:
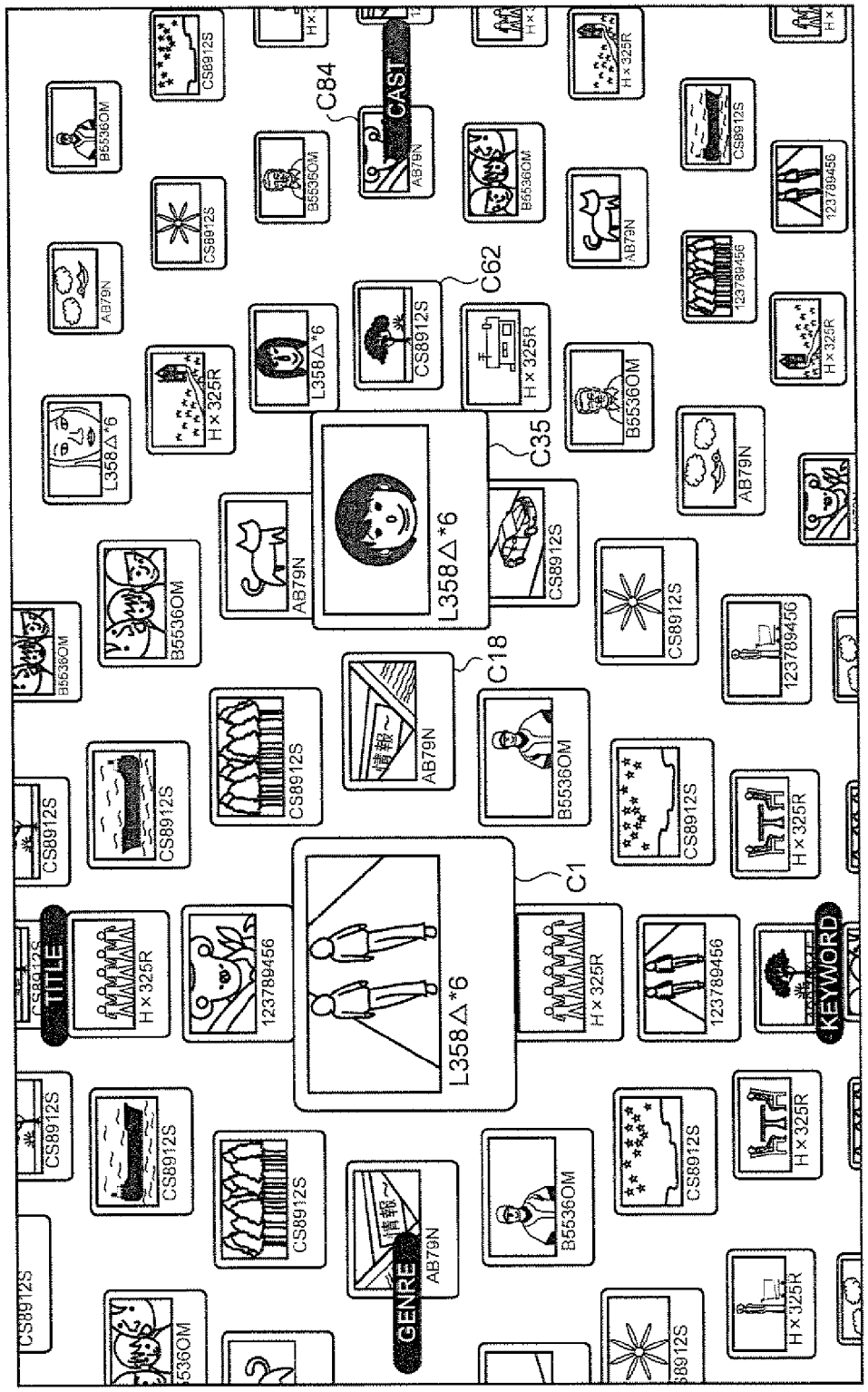

Thereafter, if an instruction is received to move the selection or focus from the display information C18 to the display information C35 of another content, the cursor further moves one space to the right, and also the list information is scrolled once again to the left. Thus, the list information as illustrated in FIG. 18 is displayed on the display module 170.

Figure 19:
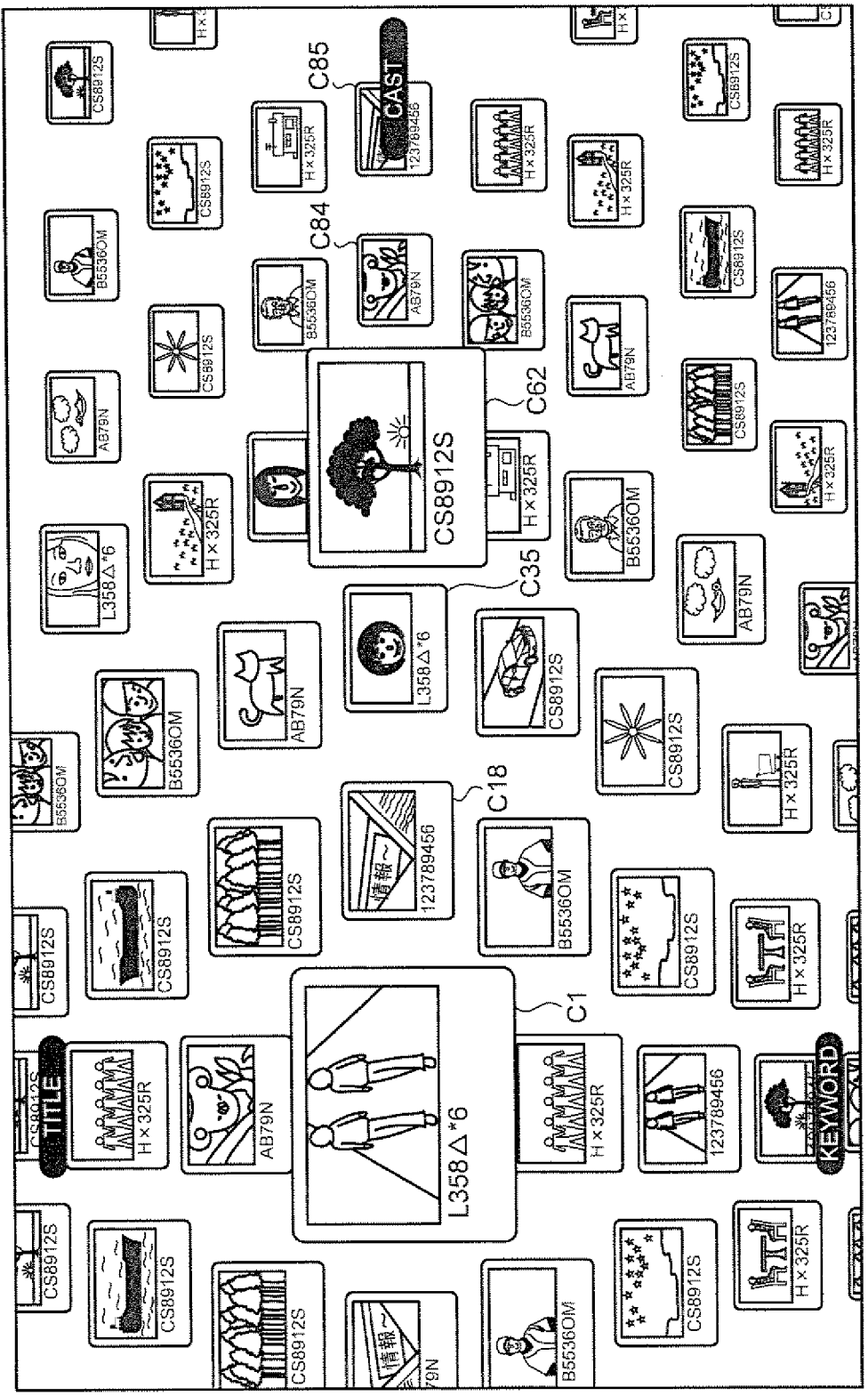

If a further instruction is received to move the selection or focus from the display information C35 to display information C62 of another content, the cursor further moves one space to the right, and also the list information is scrolled once again to the left. Thus, the list information as illustrated in FIG. 19 is displayed on the display module 170. At this point, all pieces of display information of other contents belonging to the item "Genre" move to the outside of the display range, which removes the item "Genre" from the display range. Accordingly, the display controller 106 does not display the item "Genre" in the list information.

Figure 20:
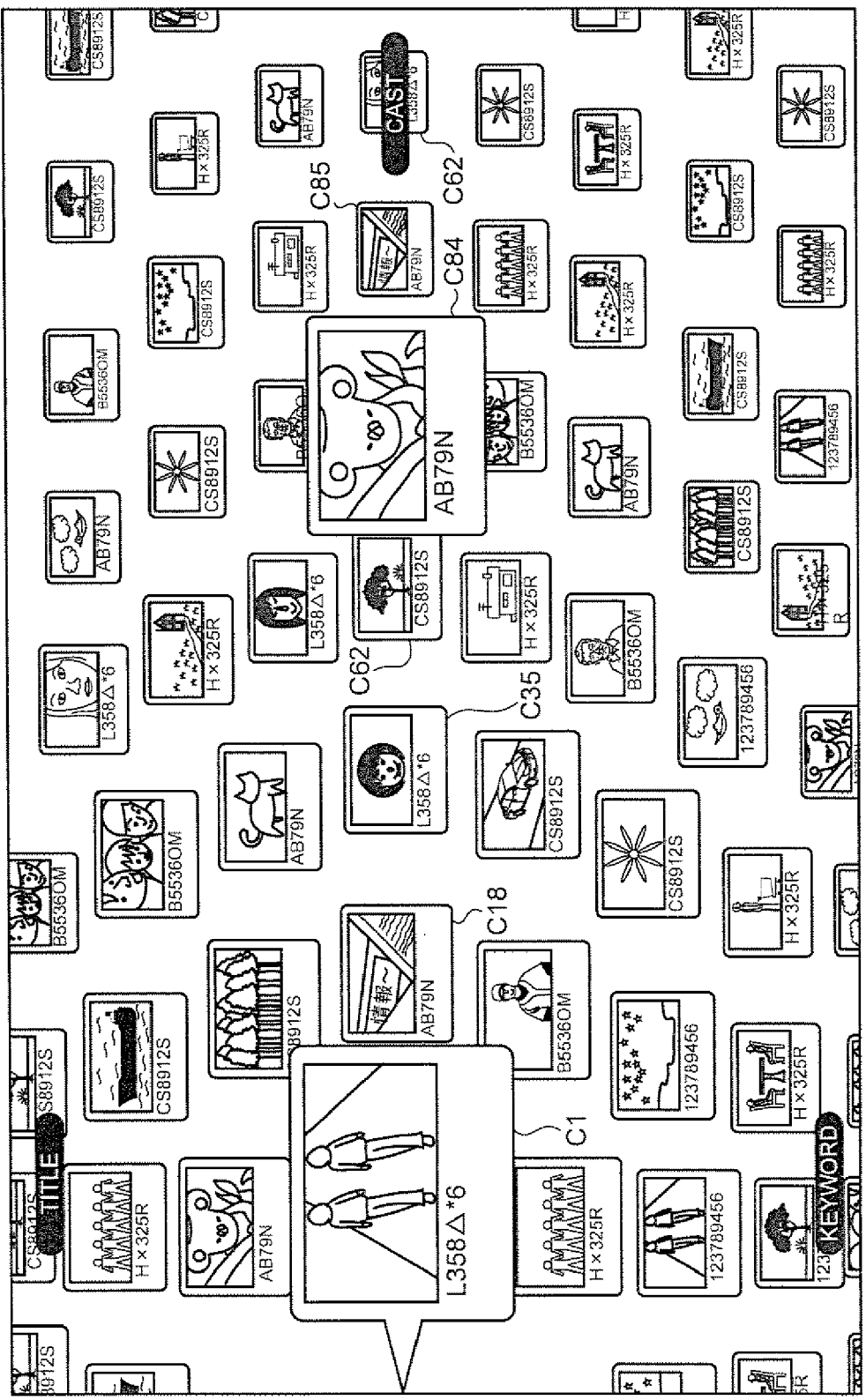

If a still further instruction is received to move the selection or focus from the display information C62 to display information C84 of another content, the cursor further moves one space to the right, and also the list information is scrolled once again to the left. Thus, the list information as illustrated in FIG. 20 is displayed on the display module 170. At this point, the initial display position of the display information C1 moves to the outside of the display range. Therefore, the display controller 106 displays the display information C1 with direction indication pointing to the left to indicate the initial display position. Since the initial display position of the display information C1 has already moved outside the display range, even if the list information is further scrolled to the left, the display information C1 stays at that position. The distance between the current display position and the initial display position of the display information C1 is represented by the display size of the direction indication.

Figure 21:
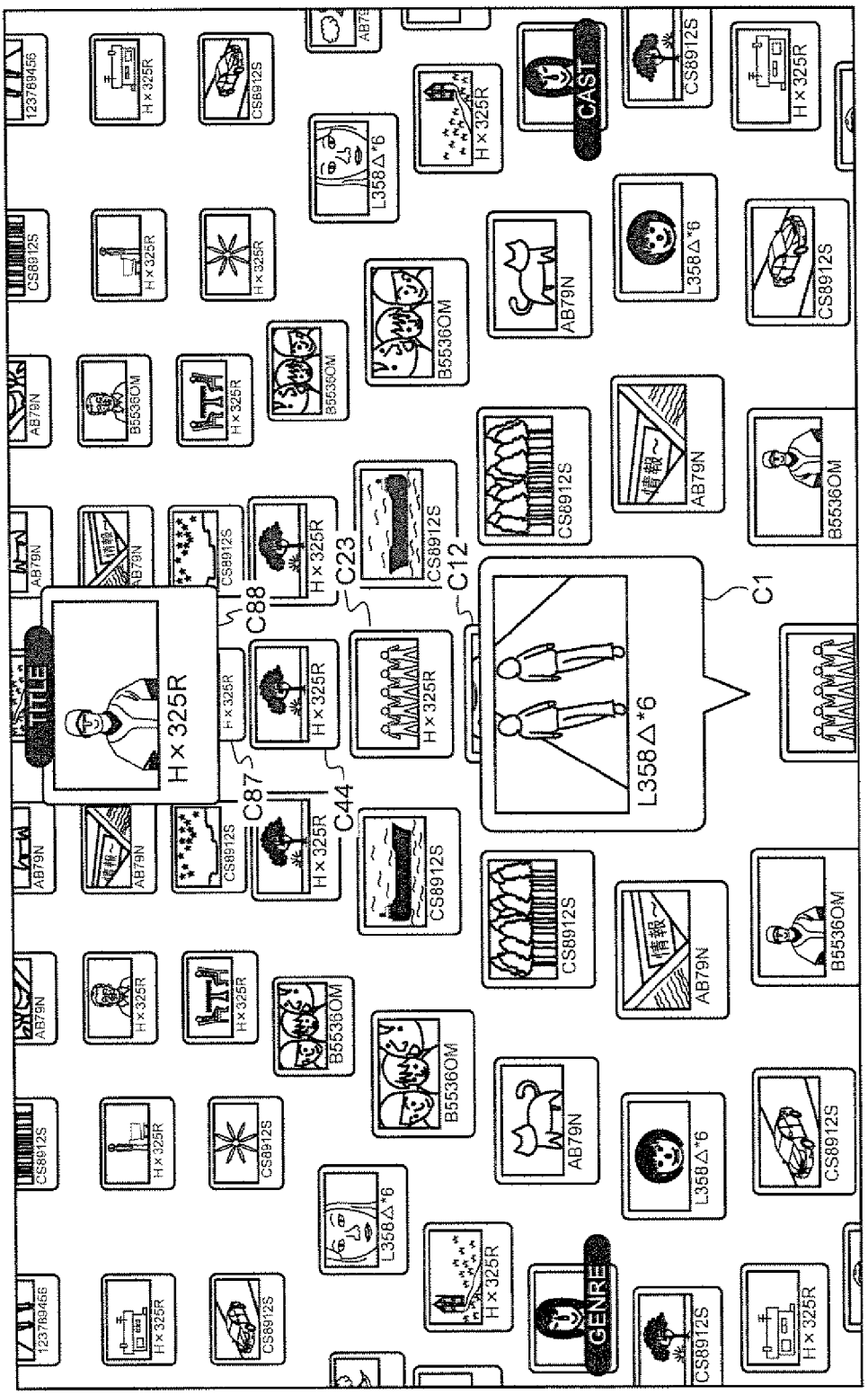
FIG. 21 is an exemplary schematic diagram of the list information scrolled down five times in which are arranged the display information of the key content and that of other contents in the embodiment.

A description will be given of the case where the list information is scrolled down. FIG. 21 is a schematic diagram of the list information scrolled down five times in which are arranged the display information of the key content and that of the other contents. As illustrated in FIG. 21, upon receipt of an instruction to move the selection or focus from the display information C1 of the key content to the display information C88 of another content, the cursor moves five spaces up, and also the list information is scrolled down five times. At this point, the initial display position of the display information C1 moves to the outside of the display range. Therefore, the display controller 106 displays the display information C1 with direction indication pointing down to indicate the initial display position.

Figure 22:
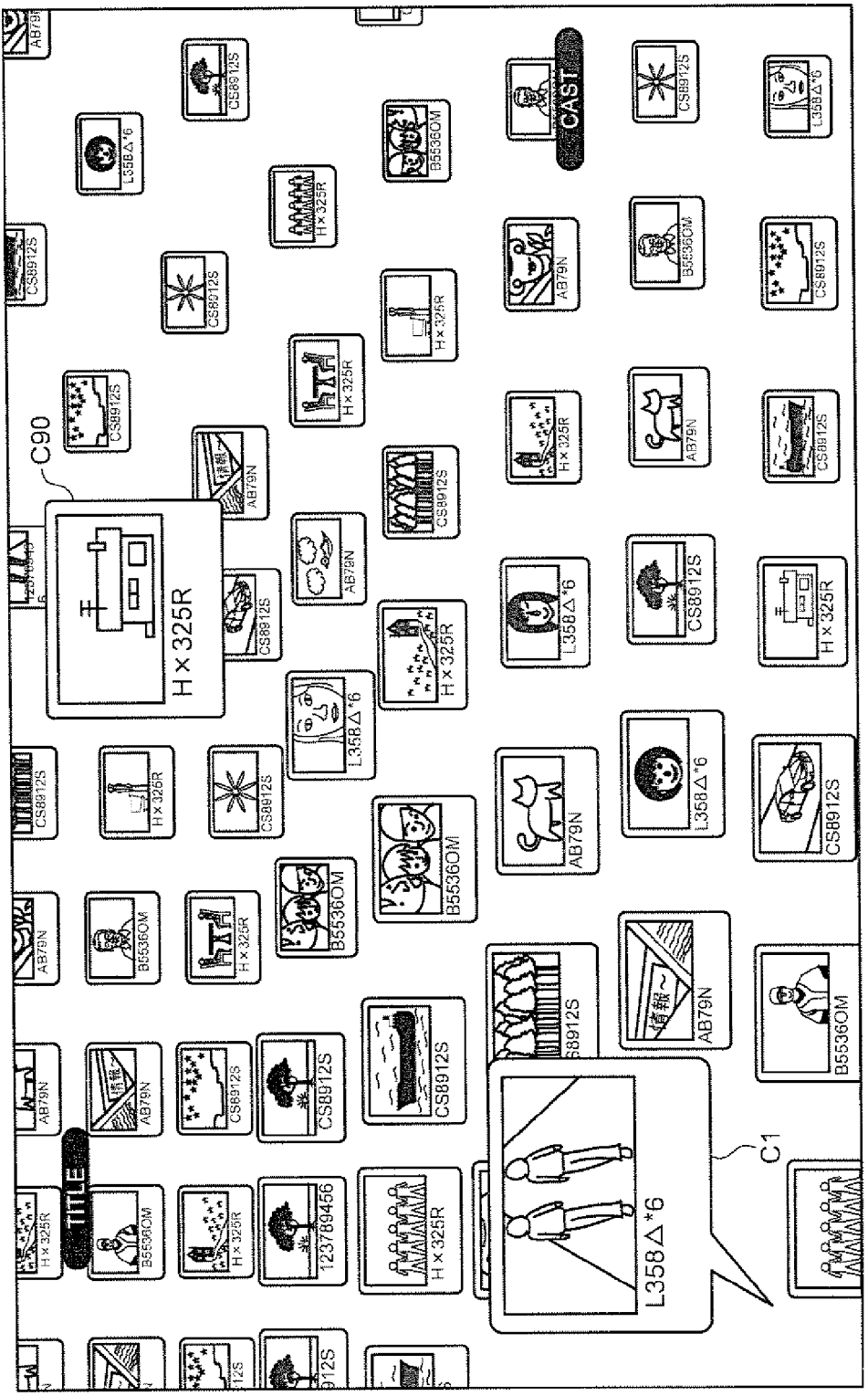
FIG. 22 is an exemplary schematic diagram of the list information scrolled left five times in which are arranged the display information of the key content and that of other contents in the embodiment.

A description will then be given of the case where the list information is scrolled left and down. FIG. 22 is a schematic diagram of the list information scrolled left and down five times each in which are arranged the display information of the key content and that of the other contents. As illustrated in FIG. 22, upon receipt of an instruction to move the selection or focus from the display information C1 of the key content to display information C90 of another content, the cursor moves five spaces to the right and five spaces up, and also the list information is scrolled left five times and down five times. At this point, the initial display position of the display information C1 moves to the outside of the display range. Therefore, the display controller 106 displays the display information C1 with direction indication pointing to the lower left to indicate the initial display position.

With this, every time the list information is scrolled, the display information of the key content is always displayed in the display range. Thus, by operating the remote controller 90, a user can easily retrieve content related to the key content as a search key from various types of contents while learning the initial display position of the display information of the key content.

A computer program (hereinafter, "display processing program") may be executed on a computer to realize the same function as the display processing apparatus 100. The display processing program may be provided to the computer as being stored in a computer-readable storage medium, such as a compact disc-read only memory (CD-ROM), a flexible disk (FD), a compact disc recordable (CD-R), and a digital versatile disc (DVD), as a file in an installable or executable format.

The display processing program may be stored in a computer connected via a network such as the Internet so that it can be downloaded therefrom via the network. The display processing program may also be provide or distributed via a network such as the Internet.

Further, the display processing program may be provided as being previously stored in the ROM or the like. The display processing program includes modules that implement the constituent elements described above (the remote controller operation receiver 101, the metadata retriever 102, the metadata acquiring module 103, the relation calculator 104, the display information generator 105, the display controller 106, the video reproducer 107, and the broadcast receiver 108). As actual hardware, the CPU (processor) loads the display processing program from the storage medium into a main storage device and executes it to implement the remote controller operation receiver 101, the metadata retriever 102, the metadata acquiring module 103, the relation calculator 104, the display information generator 105, the display controller 106, the video reproducer 107, and the broadcast receiver 108 on the main storage device.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display processing apparatus including a processor, the display processing apparatus comprising:

an operation receiver configured to receive operation to select a key content as a search key;

a display information generator configured to generate display information indicating the key content and display information indicating other contents related to the key content;

a display controller configured to display list information including the display information of the key content at a predetermined position and pieces of the display information of the other contents, each piece of the display information of the other contents being arranged according to a relation of a corresponding piece of the display information of the other content; and a scrolling module configured to scroll the list information in a predetermined display range, wherein when an initial display position where the display information of the key content is initially displayed moves outside the display range, the display controller displays the display information of the key content with direction information indicating direction of the initial display position in the display range, and the display controller is configured to display the direction information in different sizes depending on distance between the display information of the key content and the initial display position.

2. The display processing apparatus of claim 1, wherein the display controller is configured to display the direction information in a substantially triangular shape with a corner pointing to the initial display position, and the display controller is configured to display the direction information smaller as the distance between the display information of the key content and the initial display position increases.

3. The display processing apparatus of claim 1, further comprising a display module configured to display the display information of the key content and the display information of the other contents.

4. The display processing apparatus of claim 1, further comprising a relation calculator configured to calculate relation between the key content and the other contents, wherein the display controller is configured to display the display information of the key content at the predetermined position and pieces of the display information of the other contents around the display information of the key content, the pieces of the display information of the other contents being arranged to form a plurality of concentric polygons with the display information of the key content as center along directions of operation on the input module such that display information of content with higher relation to the key content is closer to the center.

5. The display processing apparatus of claim 4, wherein the display controller is configured to display the display information of the key content in largest size, and display the pieces of the display information of the other contents smaller as distance from the center increases.

6. The display processing apparatus of claim 4, wherein the display controller is configured to display information of content specified through the input module larger than display information of other contents not specified.

7. The display processing apparatus of claim 4, further comprising a metadata acquiring module configured to acquire metadata of the key content and metadata of the other contents, wherein the relation calculator is configured to calculate the relation between the key content and each of the other contents with respect to each of items contained in the metadata based on the metadata of the key content and the metadata of the other contents, and the display controller is configured to display the list information divided into predetermined areas, each assigned one of the items, in radial directions from the center, the pieces of the display information of the other contents being arranged with respect to each of the items such that display information of content with higher relation to the key content is closer to the center.

8. The display processing apparatus of claim 7, wherein, when there is a change in number of the items in the display range due to scrolling by the scrolling module, the display controller changes display of the items according to the change.

9. The display processing apparatus of claim 8, wherein, when an item is removed from the display range due to scrolling by the scrolling module, the display controller does not display the item.

10. The display processing apparatus of claim 9, wherein, when an item is added to the display range due to scrolling by the scrolling module, the display controller additionally displays the item.

11. A display processing method comprising:

receiving operation to select a key content as a search key by an operation receiver;

generating display information indicating the key content and display information indicating other contents related to the key content by a display information generator;

displaying list information by a display controller, the display list information including the display information of the key content at a predetermined position and pieces of the display information of the other contents, each piece of the display information of the other contents being arranged according to a relation to the display information indicating the key content; and scrolling the list information in a predetermined display range by a scrolling module, wherein when an initial display position where the display information of the key content is initially displayed moves outside the display range, the display information of the key content is displayed with direction information indicating direction of the initial display position in the display range, wherein the displaying includes displaying the direction information in a substantially triangular shape with a corner pointing to the initial display position, and displaying the direction information smaller as the distance between the display information of the key content and the initial display position increases.

12. A computer program product comprising a computer-readable storage medium having computer readable program codes embodied in the medium that, when executed, causes a computer to implement:

an operation receiver configured to receive operation to select a key content as a search key;

a display information generator configured to generate display information indicating the key content and display information indicating other contents related to the key content;

a display controller configured to display list information including the display information of the key content at a predetermined position and pieces of the display information of the other contents; and a scrolling module configured to scroll the list information in a predetermined display range, wherein when an initial display position where the display information of the key content is initially displayed moves outside the display range, the display controller displays the display information of the key content with direction information indicating direction of the initial display position in the display range, the display controller is configured to display the direction information in a substantially triangular shape with a corner pointing to the initial display position, and the display controller is configured to display the direction information smaller as the distance between the display information of the key content and the initial display position increases.

* * * * *